(12) United States Patent
Ritchie et al.

(10) Patent No.: US 6,295,530 B1
(45) Date of Patent: *Sep. 25, 2001

(54) INTERNET SERVICE OF DIFFERENTLY FORMATTED VIEWABLE DATA SIGNALS INCLUDING COMMANDS FOR BROWSER EXECUTION

(76) Inventors: Andrew M. Ritchie, 15 Benwell Court, Sunbury-on-Thames (GB), TW16 6RU; Jonathan M. Bradshaw, 30 Underwood, Bracknell (GB), RG12 8XL ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/647,769

(22) Filed: May 15, 1996

(30) Foreign Application Priority Data

May 15, 1995 (GB) .................................................. 9509828

(51) Int. Cl.[7] .................................................. G06F 17/30
(52) U.S. Cl. .................................. 707/4; 709/200; 705/10
(58) Field of Search ..................................... 395/601, 610, 395/615, 200.3, 200.57; 345/471, 200.57, 104, 513; 707/2, 3, 4, 10, 103, 7, 102, 104, 513; 705/14, 10; 709/218, 227, 200; 37/367

(56) References Cited

U.S. PATENT DOCUMENTS 5,530,852 * 6/1996 Meske, Jr. et al. .................. 395/600

(List continued on next page.)

FOREIGN PATENT DOCUMENTS

0634718 A2    1/1995 (EP) ......................................... 9/445

OTHER PUBLICATIONS

Shklar et al, "Putting Legacy Data on the Web: a Repository Definition Language", Computer Networks and ISDN Systems 27, (1995) 939–951.

Agosti et al., "Automatic Authoring . . . ", Multimedia Systems, vol. 3, No. 1, pp. 15–24 (Feb. 1995).

Handley et al., "The World–Wide Web . . . ", Connexions, vol. 9, No. 2, pp 12–24 (Feb. 1995).

Vetter et al., "Mosaic and the World–Wide Web", Computer, vol. 27, No. 10, pp 49–57 (Oct. 1994).

Francis Heylighen, "World–Wide Web . . . ", Proceedings of SHARE Europe Spring Conference, pp. 355–368 (Spring 1994).

Gee et al., "Novel Approaches to Automating . . . ", Proceedings of 18th Int'l Online Information Meeting, pp. 501–511 (1994).

"A Medium in the Making", EXE: The Software Developers' Magazine, vol. 9, Issue 12 (May 1995).

"What is Versatile Virtual Vending?" Article no date.

Mary Ann Pike, "How the World–Wide Web Works", The World–Wide Web, Chapter 30, pp. 677–690 no date.

"In the Stores, In the Online Stores", Personal Computer Magazine, p. 44 (Jul. 1994).

*Primary Examiner*—Thomas Black
*Assistant Examiner*—Charles L. Rones
(74) *Attorney, Agent, or Firm*—Nixon & Vanderhye P.C.

(57) ABSTRACT

Output signals are served from a serving device to a plurality of browsing devices connected to a network. The output signals represent commands executable by each browsable device so as to display viewable data in accordance with specified page formatting. Requests from browsing clients are identified which contain information relating to the data itself and the display format for the data. The data is read and processed so as to combine a representation of the viewable data with executable instructions. The signals are then supplied to requesting browsing devices, after effectively being assembled as a real time on-line process.

17 Claims, 14 Drawing Sheets

U.S. PATENT DOCUMENTS

| | | | | |
|---|---|---|---|---|
| 5,583,978 | * | 12/1996 | Collins et al. | 345/471 |
| 5,732,219 | * | 3/1998 | Blumer et al. | 395/200.25 |
| 5,740,549 | * | 4/1998 | Reilly et al. | 705/14 |
| 5,742,762 | * | 4/1998 | Scholl et al. | 395/200.3 |
| 5,745,889 | * | 4/1998 | Burrows | 707/2 |
| 5,745,899 | * | 4/1998 | Burrows | 707/102 |
| 5,761,673 | * | 6/1998 | Bookman et al. | 707/104 |
| 5,764,916 | * | 6/1998 | Busey et al. | 709/227 |
| 5,781,714 | * | 7/1998 | Collins et al. | 345/471 |
| 5,790,793 | * | 8/1998 | Higley | 709/218 |
| 5,809,502 | * | 9/1998 | Burrows | 707/7 |
| 5,844,227 | | 12/1998 | Schmidt et al. | 235/472 |
| 5,848,410 | * | 12/1998 | Walls et al. | 707/4 |
| 5,864,863 | * | 1/1999 | Burrows | 707/103 |
| 5,894,554 | * | 4/1999 | Lowery et al. | 707/10 |
| 5,903,889 | * | 5/1999 | Huerga et al. | 707/3 |
| 5,974,441 | * | 10/1999 | Rogers et al. | 709/200 |
| 5,991,735 | * | 11/1999 | Gerace | 705/10 |
| 6,003,046 | * | 12/1999 | Nielsen | 707/513 |
| 6,068,188 | | 5/2000 | Knowles | 235/462.01 |
| 6,076,733 | * | 5/2000 | Wilz, Sr. | 235/462.01 |
| 6,154,738 | * | 11/2000 | Call | 707/4 |

* cited by examiner

ASCII transmission to a browser

```
1   <HEAD><TITLE>Home Shopper</TITLE></HEAD>
2   <BODY>
3   <hr size=1>
4   <H1>Contents Page></H1>
5   <A HREF="http://localhost:8081/vdl/123456/1000/123/999">
6   <img src="/im/sport.gif" align=middle hspace=5>Sports</A>
7   <A HREF="http://localhost:8081/vdl/123456/1001/123/999">
8   <img src="/im/elec.gif" align=middle hspace=5>Electrical</A>
9   <p>
10  <A HREF="http://localhost:8081/vdl/123456/1002/123/999">
11  <img src="/im/elec.gif" align=middle hspace=5>Computers</A>
12  <A HREF="http://localhost:8081/vdl/123456/1003/123/999">
13  <img src="/im/child.gif" align=middle hspace=5>Childrens</A>
14  <p>
15  <A HREF="http://localhost:8081/vdl/123456/1004/123/999">
16  <img src="/im/gard.gif" align=middle hspace=5>Gardening</A>
17  <A HREF="http://localhost:8081/vdl/123456/1005/123/999">
18  <img src="/im/clth.gif" align=middle hspace=5>Clothing</A>
19  <hr size=1>
20  <p>
21  </BODY>
```

Figure 8

INTERNET SERVICE OF DIFFERENTLY FORMATTED VIEWABLE DATA SIGNALS INCLUDING COMMANDS FOR BROWSER EXECUTION

BACKGROUND OF THE INVENTION

1. Field of the Invention

The present invention relates to serving signals to browsing clients, wherein said signals represent commands executable by said browsing clients for generating structured pages of human viewable data.

2. Related Art

The serving of human viewable data in response to client requests has been known for some years in the field of cable television systems. Star type systems in particular allow viewers to make selections resulting in remote switching being performed so as to route a selected signal from a distribution head to the requesting viewer. Cable television systems are usually based on standard broadcast television signals and, as a result, a substantial transmission bandwidth is required in order to provide each viewable page of data. Recently, attempts have been made to compress video date, by implementing recommendations using standards such as MPEG, so as to facilitate the distribution of video signals over channels of substantially less bandwidth. Thus, it is now possible to transmit low quality video signals over conventional telephone lines using temporal and spatial compression techniques.

It has also been possible to distribute human viewable data in the form of encoded text for a number of years. The transmission of text, often using ASCII coding, requires substantially less bandwidth than the transmission of video signals and for a number of years data of this type has been transmitted over conventional telephone cables.

A problem with transmitting conventional data text, compared to image related video signals, is that the quality of presentation and overall graphical format is significantly impaired. For this reason, traditionally, the transmission of data, as distinct from video, has tended to develop only in specialist fields where presentation was not considered particularly important. Very often, for example, the data being received would be considered as being quite valuable and very often it would be possible to justify the re-typing of information as and when required.

A further problem with the dissemination of data is that many standards and conventions have developed over the years. Therefore, traditionally, users have needed to develop techniques for accessing different data sources, which in itself has tended to become a specialist activity.

In parallel with the tendency towards bandwidth reduction in the transmission of video signals, there has also been a tendency towards improving the graphical format, structure and presentation of what would normally be considered as textural data. Thus, although data may be transmitted within a text-based environment, such as within the internationally accessible network known as the "Internet", there has been a tendency towards including formatting structures such that a substantially data-driven source could be viewed by a user on equipment which would present the data in a form substantially similar to that of a video image. Thus, the two arts of video signal processing and image data processing are coming closer together and reaching towards a common aim of providing what appears to be a high resolution, high bandwidth, high quality image by transmitting data over low bandwidth transmission media For a number of years, cable television systems have been used to provide in-home shopping facilities and, given their two-way capabilities, it is possible to install a level of interactivity within such systems. On-line systems facilitate a higher level of interactivity and, in addition to making particular selections in response to images being broadcast, it is also possible to select particular image pages by browsing through catalogues and tree structures etc. Thus, given an ability to display high quality images, similar to those available through video based systems, on-line systems present environments with substantially more interactive capabilities. However, it is appreciated that in many of these environments the quality of images must be significantly enhanced in order to attain a broad customer base.

A known way of improving the quality of images derived from text-based systems is to add formatting commands or instructions to data strings. These instructions control operations of a receiver, such that the signals are processed in such a receiver, to ensure that the transmitted signals are processed in such a way as to generate a high quality video image that is capable of being displayed at a requesting client's terminal.

In addition to improving the quality of displayed images, such an approach also facilitates an improvement in system compatibility. Thus, the incoming control signals are executed by a receiver's terminal in a way that is compatible with the receiving system. Thus, the output signals may be considered as executable instructions that cause operations to be performed upon the viewable data in accordance with the local constraints.

Thus, the use of systems of this type must be distinguished from simple local database systems in which all operations of the system are locally controlled and no account whatsoever needs to be taken of remote facilities and characteristics. Such systems are significantly different in that database systems only transfer data that is subsequently manipulated by controlling programs. In mark-up languages the formatting commands are embedded in the form of executable commands, executable at the receiving station, so as to perform operations upon the viewable data supported by the local platform and peripherals.

Mark-up languages of this type may also include other capabilities previously not found in simple data distribution systems. In particular, a highly valued additional feature is the ability to automatically receive additional files from anywhere within the overall network. Such a procedure is possible because, as previously stated, the mark-up language is effectively executed by the local platform and these executable procedures may include procedures for making external calls to files held anywhere within the accessible network.

From a user's point of view, such links may be considered as providing a level of multi-dimensionality within a viewable document in that a particular word or phrase may be selected, whereafter an expansion is provided or related documents are identified. In order to distinguish such documents from ordinary self-contained documents, text of this type is commonly referred to as "hypertext". Similarly, such links may also be made to full motion video sequences or audio sequences etc. and such an environment may be referred to as "hypermedia".

An example of a particular recommendation under which signals include commands executable by browsing clients is the "hypertext mark-up language" (HTML) developed at CERN during the late 1980s and early 1990s, which has recently become a part of the Internet through a service known as the "World Wide Web". An (HTML) file is essentially an ASCII document interspersed with tags for formatting text and displaying images. The tags graphically represent instructions which are acted upon by a receivers browser, configured to render text or graphics. The browser has full control of how the page is displayed, therefore it is possible to generate a wide range of page lay-outs from a modest set of (HTML) tags.

The Internet is an extreme example of a network in which many different types of platforms, having various protocols and processing capabilities, may be interconnected using highly distributed control instruction sets. As previously suggested, systems of this type often provide an environment in which a user may "browse" through many files and structures. Consequently environments to facilitate the reception and conversion of HTML files are commonly known as "browsers". Thus, a browser is an application capable of interpreting and displaying documents received in HTML in such a way that the information is displayed to the user in a form compatible with the user's available equipment. Thus, using sophisticated terminal equipment, provided with an appropriate browser, it is possible to display text-based data at a quality that is perceived as being substantially similar to that of full bandwidth video, while significantly reducing the level of bandwidth required in order to distribute the information. Thus, as previously stated, the purpose of the browser is to substantially improve the quality of the displayed image such that a client user is presented with a high quality video image, if suitable equipment is available. In addition, the browser ensures that compatibility is achieved between the local system facilities and the transmitted data. Furthermore, hypertext links may be defined within the document that are executed by the browser so as to make additional documents available in response to user driven selections.

Clearly, it is only possible for client users to make use of these sophisticated languages if networks include accessible data sources. HTML files may be stored in file structures that are substantially similar to conventional data formats. Requests are made, via client browsers to applications maintained at a distribution node, commonly referred to as "serers".

Both browsers and servers represent applications which must be made available when requested although, during substantially quiet periods of operation, there are not actually required as such. Procedures of this type, embedded within systems and substantially transparent to operators, have become known, collectively, as "daemnons". Thus, in operation, server daemons intermittently interrogate selected ports for incoming signal requests. In response to these requests, servers may make appropriate housekeeping and security operations, whereafter, if possible, the selected file is identified and supplied to the requesting browser.

In earlier simple ASCII based text systems, the generation of text in a form suitable for transmission over networks involved relatively easy operations. Generally, documents could be accessed from text files or databases and transmitted directly across the network. At the receiver, the input data would often be buffered, but thereafter it could be supplied directly to line printers, or similar devices, thereby producing a listing or print out of the transmitted ASCII text.

As previously stated, HTML allows sophisticated formatting structures to be added to the viewable data so as to present a substantially more appealing image to client users. However, a major disadvantage of using such systems is that it is necessary to convert source data into HTML form before it may be transmitted over the network. In practice, such a procedure is presently performed manually and a significant number of man hours may be required in order to convert originating text into an appropriate HTML version suitable for distribution throughout the network.

In some environments, such as research environments etc., data may be required for significant periods of time and under such circumstances it is possible to justify the time and effort required in order to mark up the text for distribution throughout a network in an appropriate form. However, as is well known in the magazine and newspaper arts, some forms of data, although initially highly valuable, may have very short "shelf lives" and, even the next day, they may become virtually worthless. Thus, many forms of existing paper publications may be withheld from electronic publishing if the amount of time and effort required to covert the text-based information into a form suitable for distribution throughout networks is significantly large. Furthermore, in many situations, the extent to which the time scale for performing an exercise may be reduced by increasing manpower, may be restricted, given that it is only possible for one person to work on one page at any one instant.

Traditional marking-up is a laborious task, given that, by its very nature, the actual transmitted data looks very different from the viewed image. In most situations, it is necessary for a level of marking-up to be performed, whereafter the data is transferred to a locally situated browser, so that the resulting viewable image may be considered, before further operations are performed. Once created, files are loaded on appropriate storage devices and thereafter made available to requesting customers.

Systems are available which facilitate the creation of (HTML) documents. For example, it is possible to process documents generated under word processing systems, such as "Word for Windows", whereby, in response to manual operations, (HTML) tags are added to human viewable text. Systems of this type are sold under the Trade Marks "Web-Author" and "Internet Assistant".

It is well known that traditional newspapers tend to change slightly over a day, as various editions are modified so as to take account of recent news items. Thus, very often, a late edition of a newspaper will carry a different main story to that of earlier editions. Within electronic environments, there is an expectation for an even higher level of updating and interactivity.

Presently, in order to satisfy this expectation, it would be necessary to continually update pages manually.

Systems have been proposed in which clients are given the impression that a magazine has been tailored to their particular needs. Thus, systems are known in which particular selections may be made thereby tuning documents to customer requirements. A problem with known approaches of this type is that each page viewed by a client must be pre-created, thereby doubling the number of pages required each time a decision point occurs. Such an approach may have applications in particular environments but it can be appreciated that as the number of notional pages increases, the number of actual pages required within the system becomes extremely large and the task of creating and maintaining each of these pages manually would be highly laborious and very often make the system uneconomic. This is particularly the case when dealing with publications which, in their conventional paper form, are perceived as having relatively low value or often no intrinsic value at all. Such a situation would apply to free newspapers and advertising catalogues etc.

SUMMARY OF THE INVENTION

According to a first aspect of the present invention, there is provided apparatus for serving output signals from a serving device to a plurality of browsing devices connected to a network, wherein said output signals represent commands executable by each browsing device so as to display viewable data in accordance with the specified page format, comprising: means for identifying requests from browsing clients that define a request for specified viewable data with commands for displaying said data in a specified format; means for reading data representing said viewable data; Means for processing said read data so as to combine a representation of said viewable data with executable instructions; and means for supplying output signals to the requesting browsing device derived from said processed data.

In accordance with the said invention, it is not necessary to store all output files as predefined HTML files. HTML output instructions are generated "on-the-fly" in response to requests made by users.

The apparatus may be used within many network configurations.

In a preferred embodiment, the network is the Internet. Preferably, requests are made by browsing clients in the form of URLs and output signals are supplied back to browsing devices in the form of hypertext mark-up language commands.

The apparatus may be used for supplying any type of data to users, particularly text data and graphical data.

Preferably, viewable data is read from conventional databases in response to a URL being received, whereafter this data is processed so as to configure it into HTML commands.

In a preferred embodiment, data is identified within databases by means of an index, such that the relationship between indices and the access data may be adjusted. This facilitates the updating of data without needing to generate new HTML code.

BRIEF DESCRIPTION OF THE DRAWINGS

FIG. 8 shows an example of instructions in the form supplied to the browser, in order to generate the display shown in FIG. 7;

DETAILED DESCRIPTION OF THE PREFERRED EMBODIMENT

Figure 1:
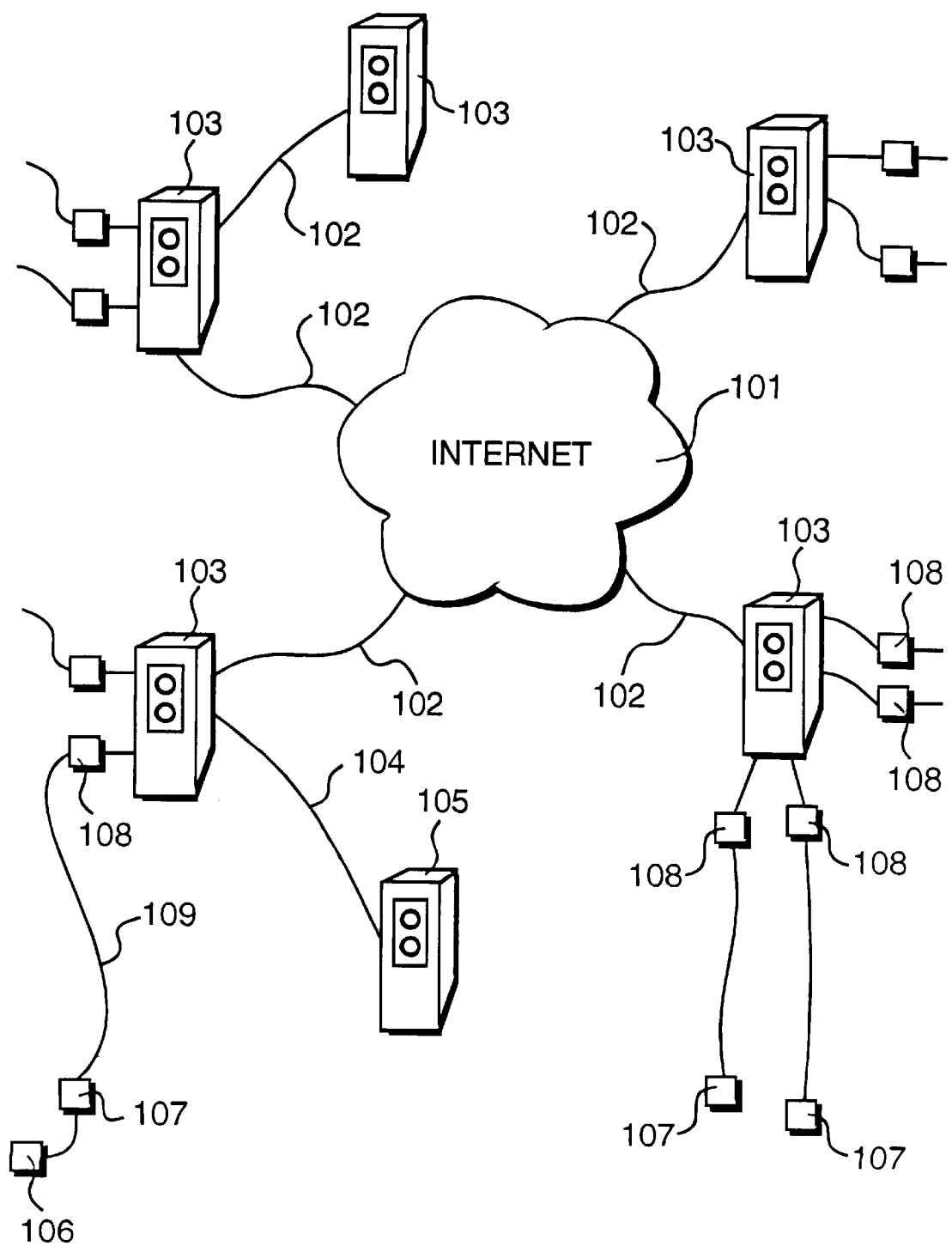
FIG. 1 is a diagrammatic representation of part of the international data distribution network known as the Internet, having a plurality of service providers and a plurality of service users; implemented using a plurality of network topologies.

A diagrammatic representation of part of the Internet is shown in FIG. 1 An international data communication network is provided, represented, diagrammatically by region 101. Access to this network is provided over data channels 102, that are in turn connected to service nodes 103. Service nodes 103 allow users to gain access to the Internet with varying levels of transmission bandwidth.

In the example, a local area network 105 is provided with a high bandwidth link 104 to an Internet service provider 103. The network 105 includes servers, that supply data to the Internet in response to requests made by users. Presently, users are given access to the Internet over channels providing traffic capacities from 14.4K bits per second (telephone dial up) to 100 M bits per second and beyond, when implemented using optical techniques.

A low bandwidth user 106 communicates with a service provider 103 via cooperating modems 107, 108 connected via a transmission cable 109. Many users of this type may access information from a server, such as server 105.

Figure 2:
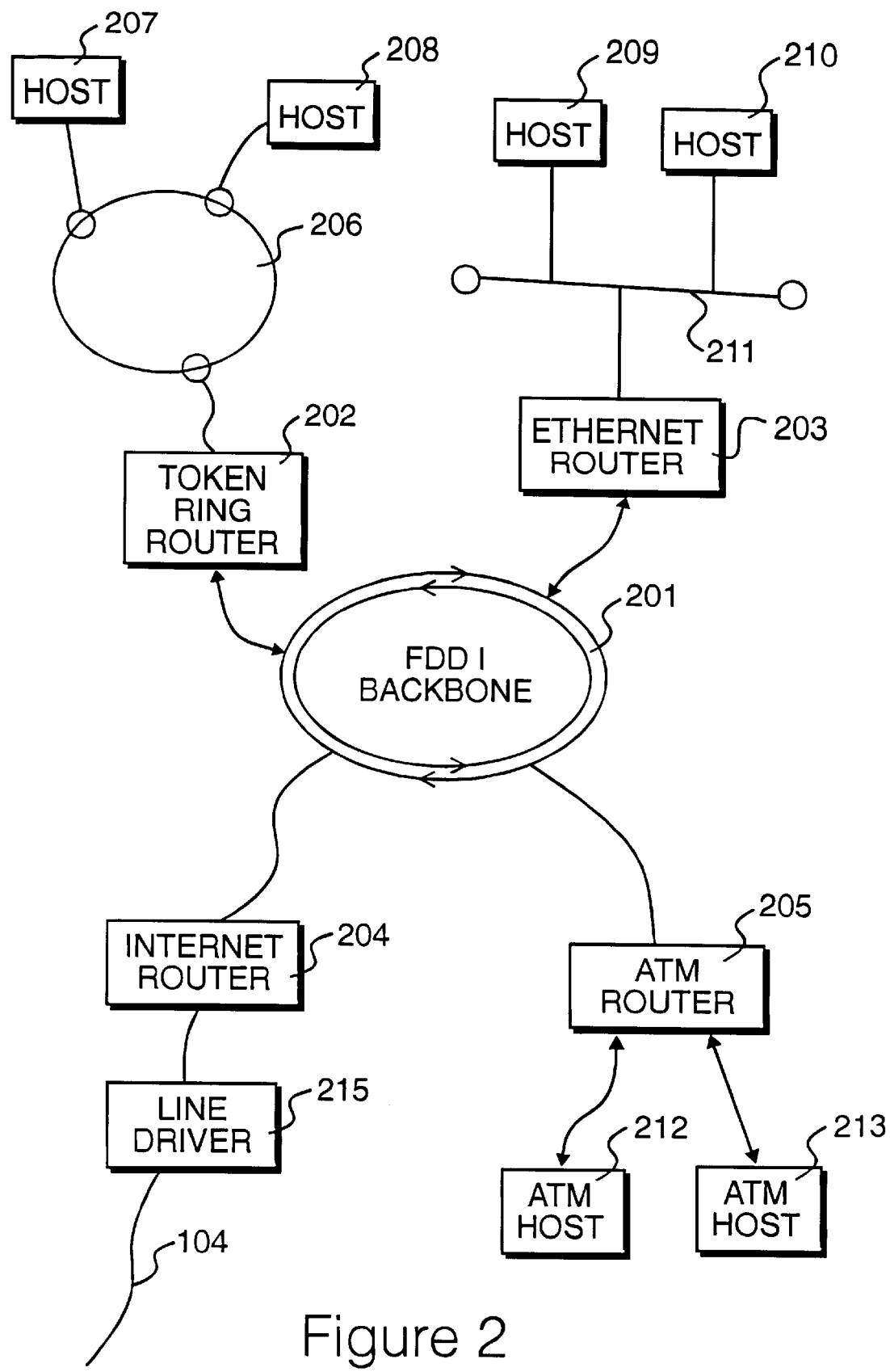
FIG. 2 shows an example of a typical service provider network of the type shown in FIG. 1; including a local area network and a serving host.

Network 105 is detailed in FIG. 2. The network comprises a fibre distributed data interface (FDDI) backbone ring 201 having four routers 202, 203, 204 and 205 connected thereto. Router 202 is a token ring router which routes data between a token ring network 206 and the FDDI backbone 201. In the example shown in FIG. 2, a first host processing system 207 and second host processing system 208 are connected to the token ring 206, thereby facilitating communication between said hosts 207 and 208, along with communication between said hosts and the backbone ring 201, via token ring router 202.

A host processing system 209, and a host processing system 210 communicate via an ethernet network 211. The ethernet network 211 also allows communication between hosts 209 and 210 and the backbone ring 201 via ethernet router 203.

The backbone ring also communicates with an asynchronous transfer mode (ATM) network, including a first ATM host 212 and a second ATM host 213. Information for distribution to the Internet is generated by "serving operations" executed by host 212. This host communicates with the backbone ring 201 via the ATM router 205, which in turn facilitates communication to the Internet itself via Internet router 204 and an Internet line driver 215. This facilitates the transfer of data to an Internet service provider, as shown in FIG. 1.

The present embodiment is directed towards providing HTML encoded data, in accordance with the HTML recommendations implemented over the Internet as a service known as "World Wide Web". However, the invention as a whole has broader application, particularly when it is necessary to process human viewable data in combination with signals representing a selected display structure, such that commands are executable by remote browsing clients.

Serving station 212, as shown in FIG. 1, serves files, processed in accordance with the established hypertext mark-up language (HTML) to browsing clients via the Internet. A browsing client makes a request for the information to be supplied and this request is identified by a serving station, such as station 212, which responds to said request by returning the information via the Internet connection to the browsing client device. Once a request has been received, first signals are processed by the serving station which represent the human viewable data. Second signals are received which represent a selected display structure. These two signals are processed in order to produce an HTML output. However, this processing step only takes place after the client request has been received such that the first signals and the second signals are processed to produce output signals in the form of client executable instructions which are then served as output signals suitable for execution by the requesting browser. In this way, many pages of HTML encoded data may be produced automatically without requiring manual effort for each individual page. Furthermore, pages may be tailored for specific user requirements and, in some circumstances, it may be possible to adjust the extent to which this customisation takes place in response to the clients own history of use, such that topics of interest are identified automatically and this identification is used in order to direct information of interest to the calling client.

The hardware of serving network 105 is shown in FIG. 2. A request from a browsing client would be received from the Internet provider via data link 104, thereby allowing the Internet router to direct the packet of information onto the backbone network 201. This packet would include an address so as to identify the processing environment arranged to serve the requested information.

Figure 3:
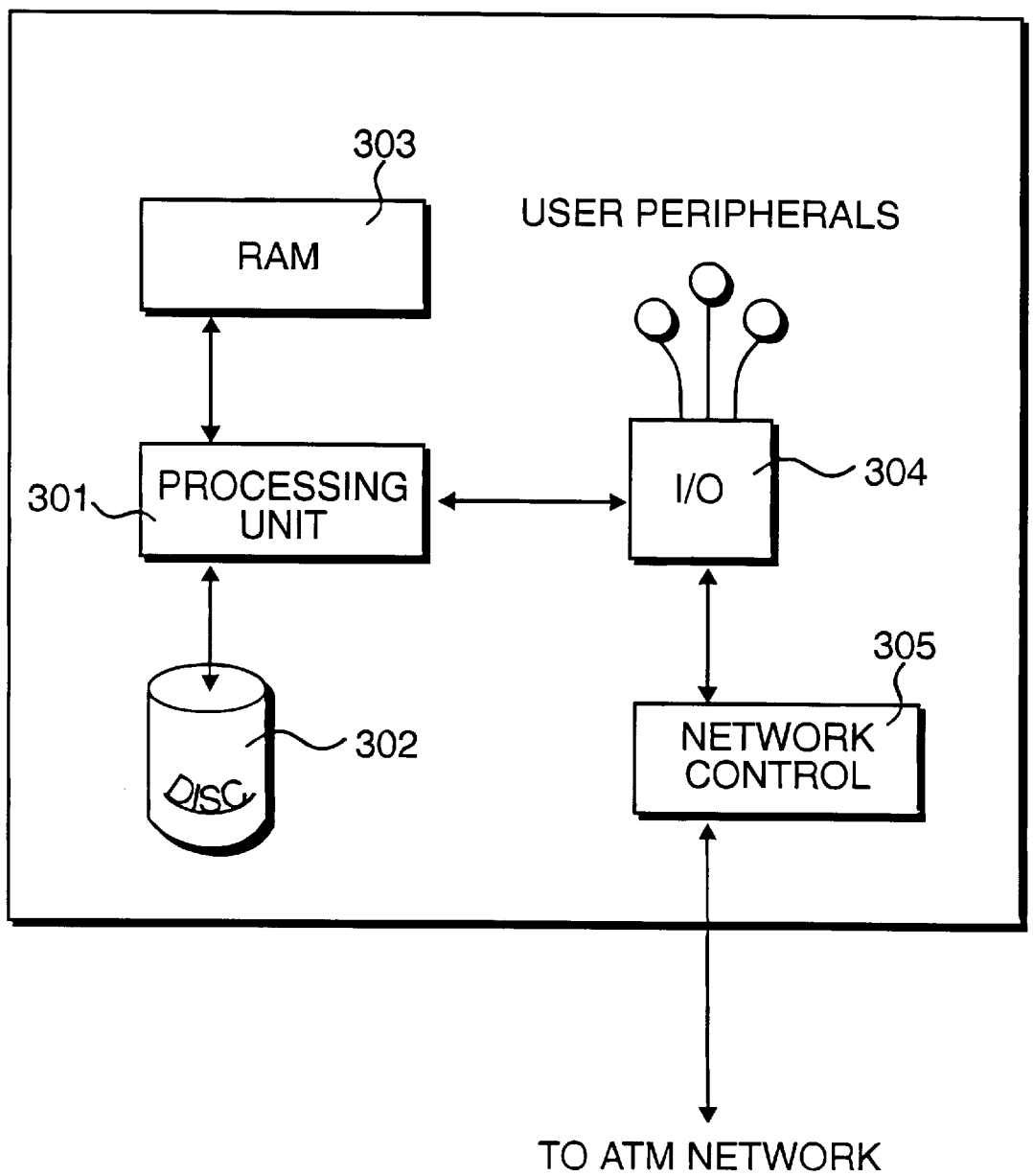
FIG. 3 details the serving host identified in FIG. 2, including a processing unit and a random access memory for storing instructions executable by said processing unit.

ATM host 212 is detailed in FIG. 3. A central processing unit 301 provides a general purpose multi-tasking processing environment, possibly running under the UNIX operating system. The processing unit includes internal buses to facilitate communication with a mass storage device, such as a hard disk drive 302, and a random access memory 303.

Communication with external devices is facilitated through an input/output (I/O) interface 304 which is in turn connected to typical user peripherals such as a keyboard, a monitor and a mouse etc. In addition, the I/O device 304 is connected to ATM router 205 via a network control circuit 305.

A routine is executed continually by the processing unit 301 to identify requests made to a particular I/O port established by the I/O circuit 304. Thus, a packet received by the backbone 201 includes an address that enables the network control interface 305 such that said controller may direct the packet to the I/O interface 304. Thus, the packet identified by the network controller 305 will be supplied to a particular port of the I/O device 304. The processing unit 301 will identify the fact that data has been supplied to the relevant port and establish a connection, effectively placing the system into an active mode. Once placed in its active mode, the packet of data passes through the I/O device 304 to become a packet of information which is then held under the control of the operating system of the processing unit 301.

In response to receiving this information, the processing unit 301 is arranged to perform the steps identified above, that is, it is arranged to process first and second signals to produce output signals in the form of client executable instructions. After this processing has taken place, the resulting output signal is returned for transmission to the Internet via line driver 215, Internet router 204, ATM router 205, network controller 305 and the I/O device 304.

Figure 4:
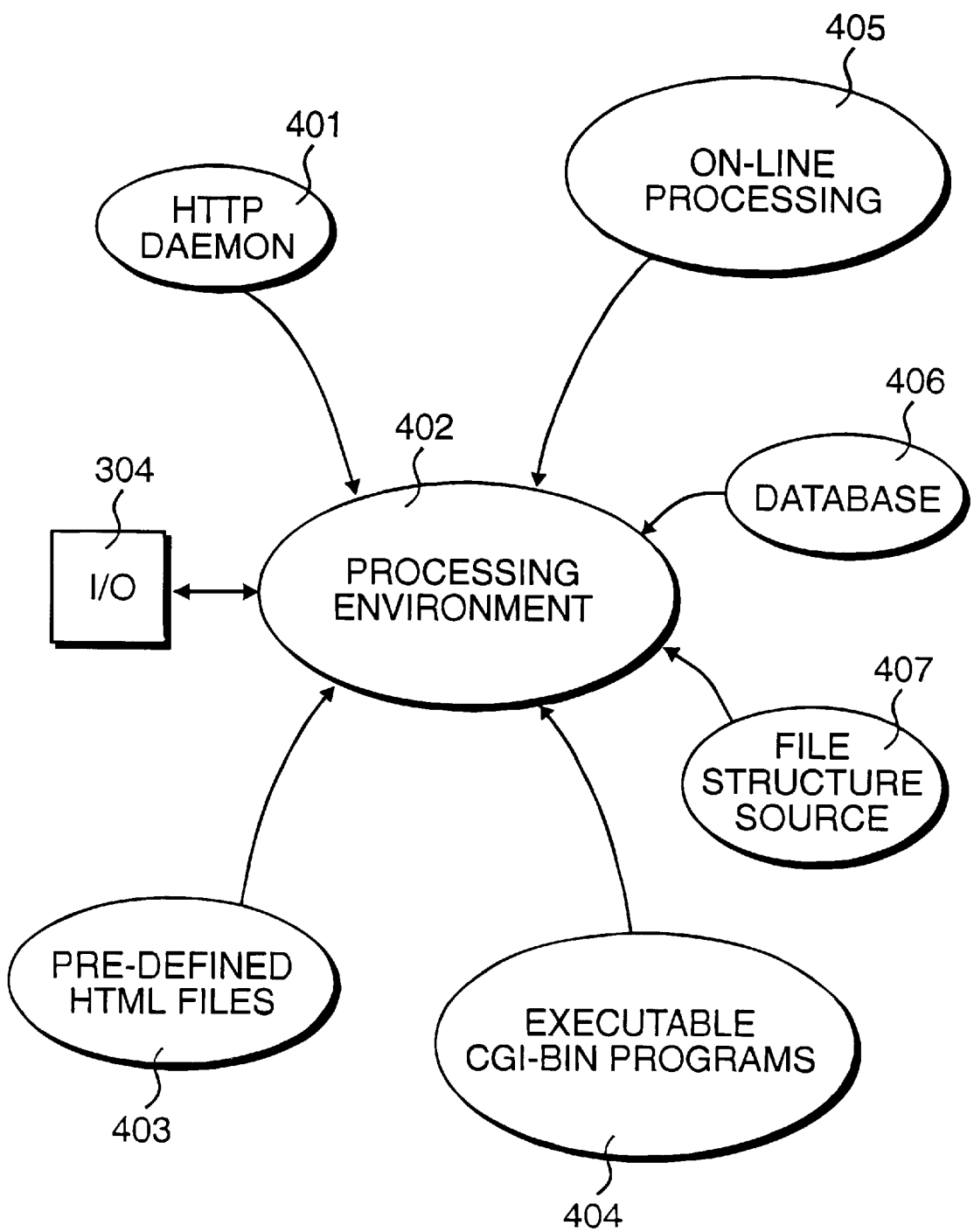
FIG. 4 represents a processing environment specified by the processing unit and its associated instructions created by the processing unit and its associated memory shown in FIG. 3, including a hypertext transport protocol daemon and on-line processing procedures in accordance with the present invention.

The processing environment provided by the processing unit 301 is illustrated in FIG. 4. An HTTP daemon 401 is executed by the processing environment 402 in order to detect requests received by the input/output device 304. In response to detected requests, the processing environment 402 is arranged to supply predetermined HTML files 403 to the I/O device 304. In addition, it is also possible for the HTTP daemon 401 to identify common gateway interface binary programs (CGI.BIN programs) which are executable instructions within the processing environment 402 and results in identified files being supplied to the I/O device 304. The CGI.BIN files are capable of operating in response to variables, including information identifying the type of browser, the host name of the system and details of the client requesting information etc. Facilities of this type are available within existing HTTP servers. However, in addition, it is possible for the daemon to respond to requests where the output HTML file will be produced "on the fly" in response to instructions identified as "on-line processing". When requested, the on-line processing will receive human viewable data from a database 406 in combination with file structures from a file structure source 407. Thereafter, in response to instructions from the on-line processing system 405, the processing environment 402 will process human viewable data in combination with file structure data to produce HTML output files for the I/O device 304.

Figure 5:
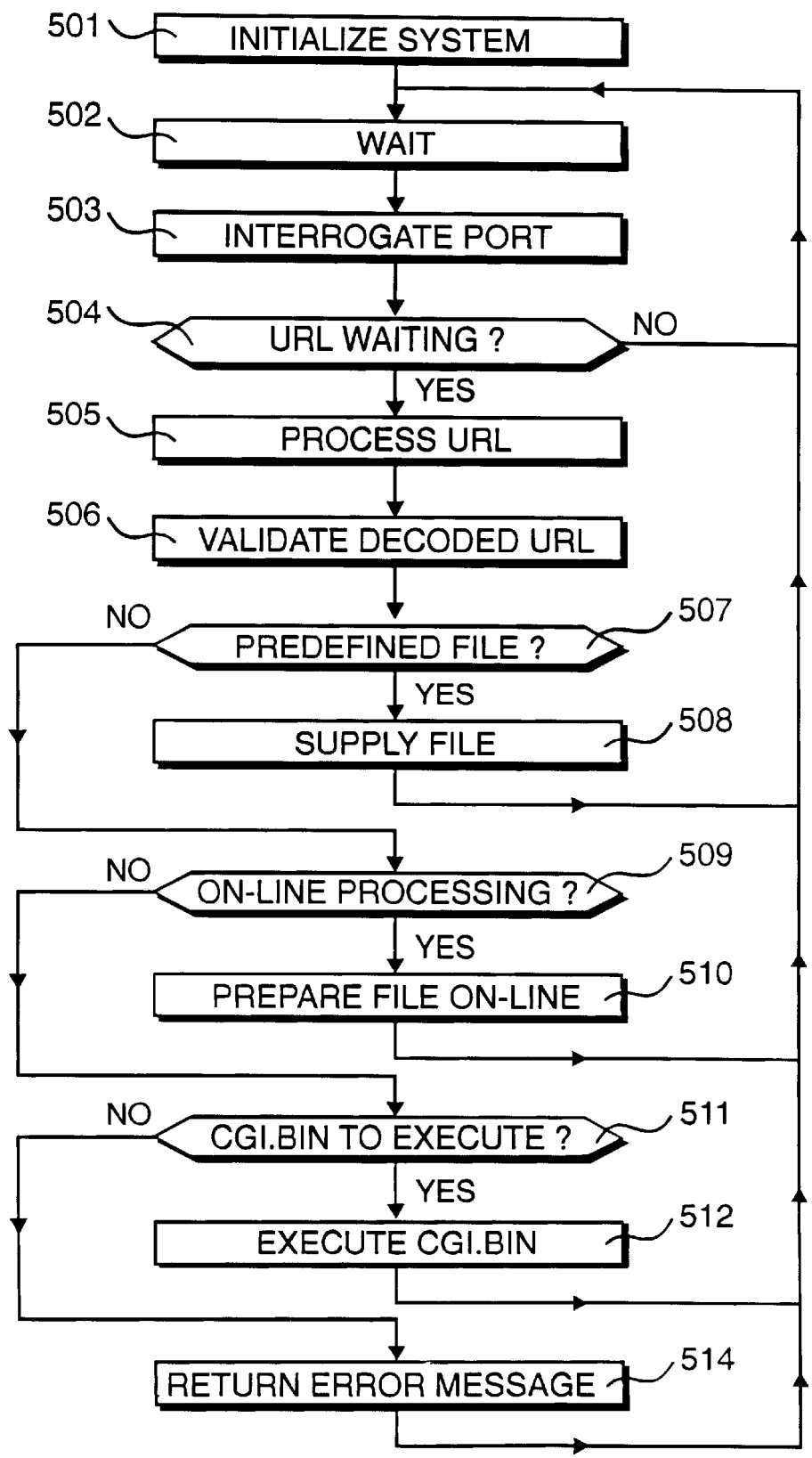
FIG. 5 illustrates the operation of the hypertext transport protocol daemon identified in FIG. 4 in response to receiving an input URL request and including an identification of initialisation procedures and procedures for performing on-line processing.

The HTTP daemon procedures identified at 401 in FIG. 4 are detailed in FIG. 5. Initialization procedures are implemented at step 501 on start up, whereafter the appropriate port is interrogated at step 503 after waiting for a predetermined period at step 502. The procedures shown in FIG. 5 are executed within a multi-tasking environment, therefore the wait period at step 502 refers to a single task and other tasks will execute without being affected. At step 504 a question is asked as to whether a user request, in the form of an uniform resource location (URL) is waiting at the interrogated port. If the question asked at step 504 is answered in the negative, control is returned to step 502 and the process repeated, Thus, as previously stated, the system operates within a multi-tasking environment, such as that provided by the UNIX operating system, Thus, while the particular tasks shown in FIG. 5 repeatedly loop until a URL is received, the system is arranged to perform other tasks.

If the question asked at step 504 is answered in the affirmative, to the effect that a URL has been detected, the URL is processed at step 505, whereafter validation procedures are executed at step 505. Validation procedures firstly determine whether the URL satisfies an acceptable structure and thereafter, security provisions may be executed in order to establish whether the server is permitted to serve the requesting client. Assuming a valid URL has been supplied to theserver, a question is asked at step 507 as to whether the client has requested a predefined HTML file. If the question is answered in the affirmative, the requested file is supplied to the requesting client at step 508 and control is then returned to step 502. Alternatively, if the question asked at step 507 is answered in the negative, control is directed to step 509.

At step 509 a question is asked as to whether the on-line processing procedures have been requested. If this question is answered in the affirmative, the requested file is prepared on-line and supplied to the browser at step 510. Alternatively, if the question asked at step 509 is answered in the negative, control is directed to step 511.

At step 511 a question is asked as to whether an instruction has been supplied to the effect that CGI.BIN are to be executed. If this question is answered in the affirmative, control is directed to step 512, resulting in the execution of the identified CGI.BIN instructions. Alternatively, if the question asked at step 511 is answered in the negative, all possibilities will have been considered and an error message is returned at step 514.

Figure 6:
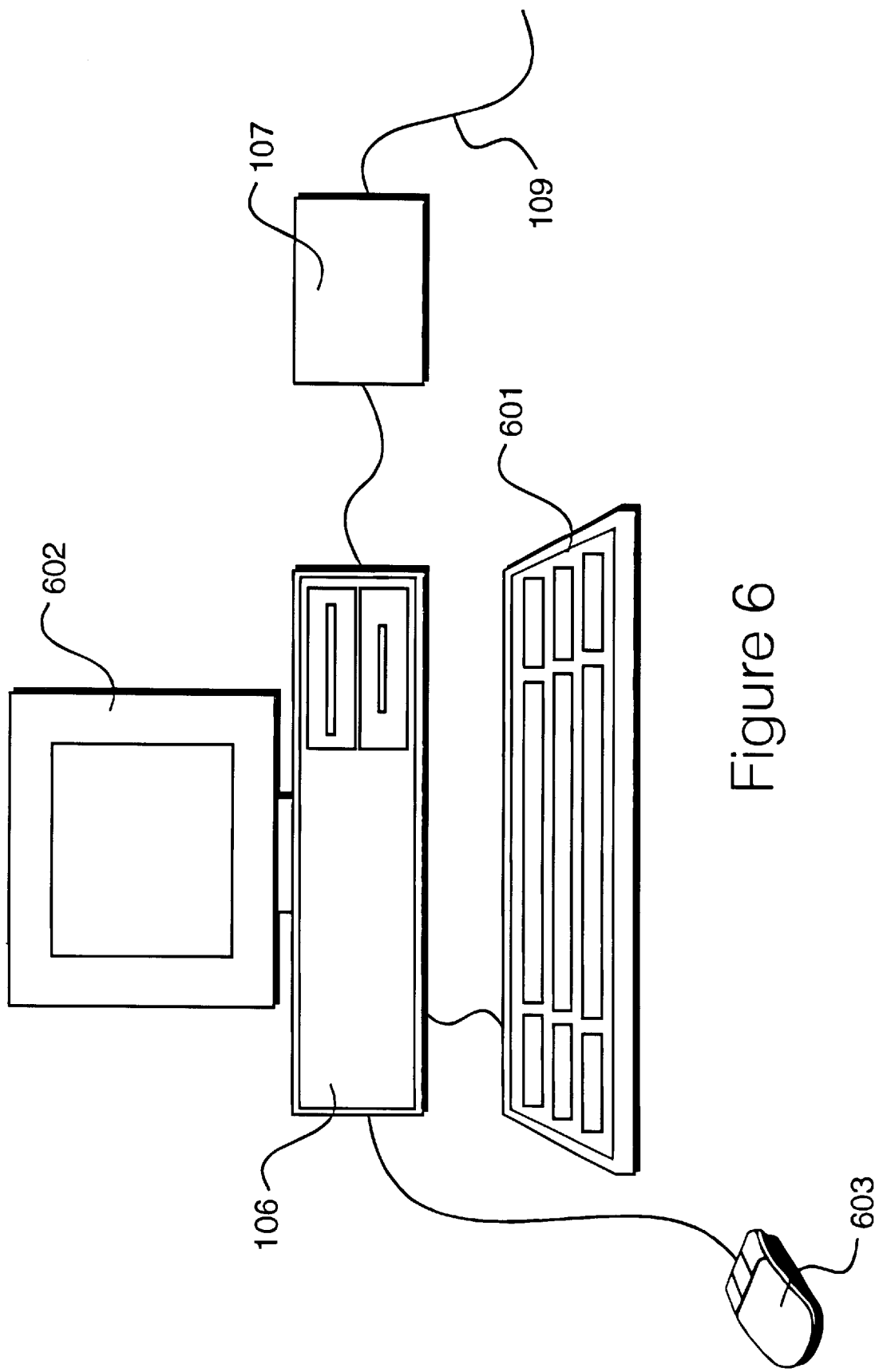
FIG. 6 shows requesting user devices, including a processing device and a visual display unit.
Figure 7:
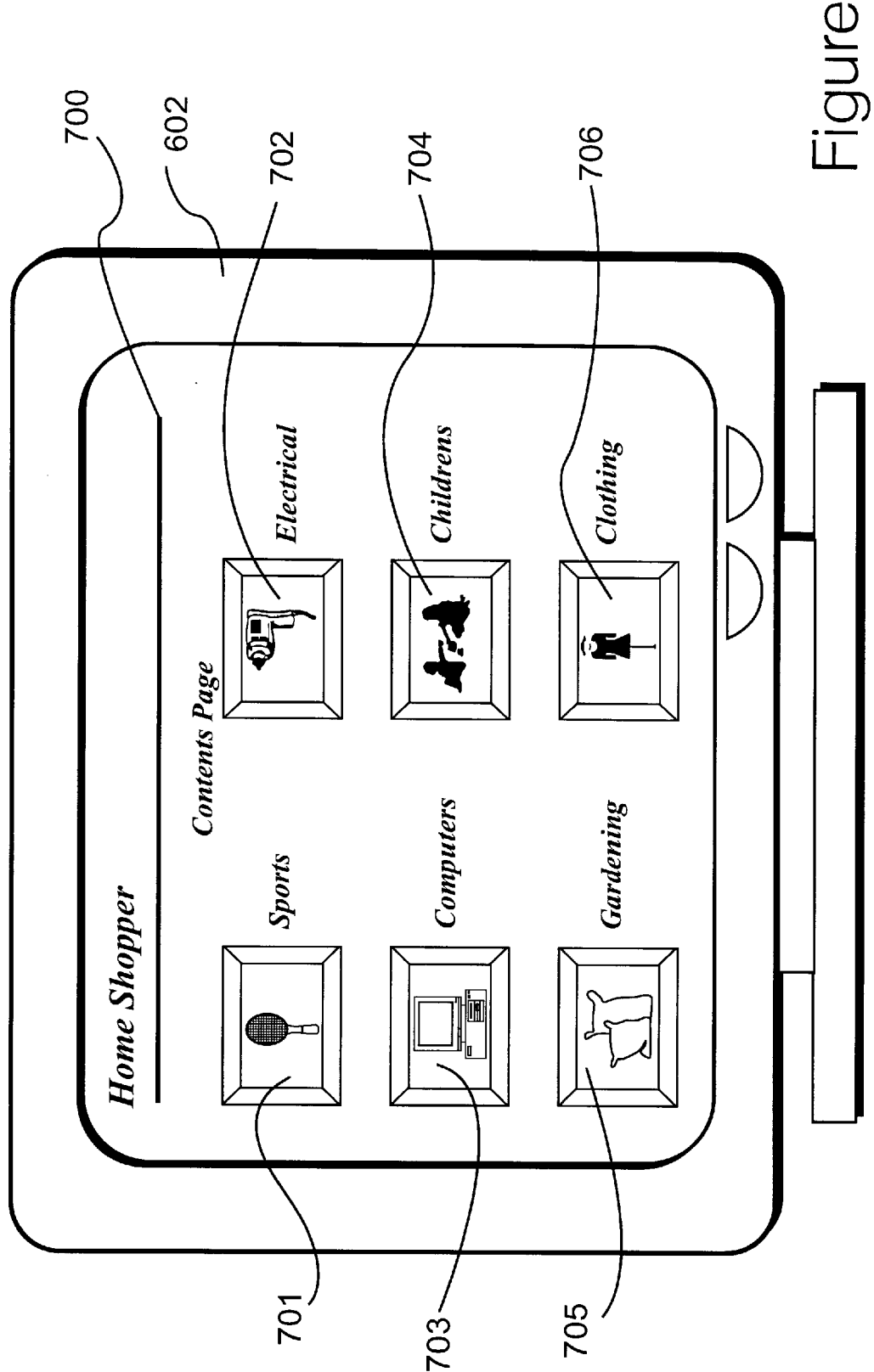
FIG. 7 illustrates a typical display shown on the visual display unit identified in FIG. 6, in response to instructions being supplied to the user from a server.

Referring to FIG. 1, server network 105 has been described with reference to FIGS. 2 and 3 and the operations executed within said server 212 could be described with reference to FIGS. 4 and 5. Information from the server 212 is supplied to requesting clients over the Internet and files are served to browsers in response to requests made by browsers. As previously stated, a browsing client 106 issues requests, in the form of URLs via a modem 107. A browsing station 106 is detailed in FIG. 6 connected to a modem 107, which is in turn connected to the Internet via communication cable 109. The browsing client hardware consists of a programmable device such as an IBM personal computer configured to operate as a browser in response to instructions installed from local permanent storage medium, usually a hard disk drive. The system includes a keyboard 601 and a visual display unit 602. An operator issues commands via the keyboard 601 or the mouse 603, causing the browser to issue a URL to the server. The browsing instructions executed by the terminal shown in FIG. 6 are configured in a form to be compatible with the serving instructions generated by the server 212. Thus, particular instructions would be installed on the server 105 and in order for users to gain access to these instructions it would be necessary to install an appropriate browser for execution on the user's terminal. Thus, in response to a user issuing commands via the keyboard 601 or mouse 603, the browser converts these instructions into a URL which is in turn processed by the remote server. This in turn results in HTML instructions being supplied to the browser from the network such that the browser effectively executes these instructions in order to generate a displayable video signal. The video signal is supplied to the monitor 602, resulting in the human viewable information being displayed on the monitor in a form derived from the HTML instructions supplied to the browser as executed by the browser itself, Monitor 602 is detailed in FIG. 7, showing a typical application of the system. In this example, on-line generation of HTML instructions are being used to present a home "shopping on-line" catalogue to users, so that said users may inspect available products and place orders for said products. Thus, the interactive environment ensures that users are kept up to date with available products and prices while at the same time allowing orders to be placed within a common facility, The page shown in FIG. 7 represents an initial contents page for a service identifying itself as a "Home Shopper", (this is a fictitious publication made for the purposes of this description and any similarities to existing publications is not intended). The contents page allows a user to quickly select areas of interest in a structured way. Thus, from the initial page, selections may be made for sports goods, electrical goods, computer goods, children's games and toys etc., gardening products or clothing. The user's terminal (shown in FIG. 6) includes a mouse 603 and operation of this mouse results in a cursor being moved over the viewed image. The image includes a graphical icon for each of the available categories. Thus, an icon 701 in the form of a tennis racquet identifies a region arranged to effect a call to the products relating to sports. Thus, the mouse may be manually adjusted so as to position the cursor over this icon. Thereafter, a mouse button may be operated resulting in execution of a hyperlink to another HTML page. Thus, the identification of the sports icon by the user will automatically result in a new URL being generated which is in turn supplied to the server via the network, resulting in a second page being supplied to the requesting user. Similarly, a graphical icon 702 of an electrical drill is provided for the electrical selection. Placing the cursor over this icon and operating a mouse button will result in a new page being supplied from the server containing electrical goods. This page may take the form of a second level contents page allowing further selections to be made. Thus, the next page may identify particular types of electrical goods, electrical DIY goods, white goods or hi-fi goods etc. Similarly, a button may be selected at this second level resulting in new icons and products being displayed. Thus, electrical DIY goods may. again be sub-divided down into drills, sanding machines, electric screwdrivers etc.

A third icon 703 shows a graphical image of a computer and, similarly, selecting this icon will result in a second level contents page being supplied identifying types of computer equipment A fourth icon 704 shows a silhouette of children at play and operation of a mouse button with the cursor placed over this icon will result in a call being made to the server and a new page being generated identifying children's games and toys.

A fifth icon 705 shows a pair of sacks and represents gardening supplies and products, while a sixth icon 706 shows a smartly dressed young lady as a means of identifying a reference to clothing. Thus, in a similar way, icon 705 or icon 706 may be selected, resulting in a call being made to the server for an appropriate page to be supplied to the browsing client.

The icons 701 to 706 are high definition graphical images and are stored as. GIF files, although other types of graphical format may be employed. The information used to construct the page is derived from a database and all of the information within the database may be modified, possibly in response to changes in availability and price etc. using conventional database techniques. Previously, all HTML pages were constructed and stored as such, thereby making them available when requests were issued by clients. Such an arrangement is similar to that identified at step 508 in FIG. 5, where a predetermined file is supplied to a requesting user. In some situations such an approach provides a perfectly adequate solution. For example, technical papers and reference books tend not to change once they have been published and thereafter reference may be made to these documents for a considerable period of time. However, shopping catalogues tend to change at least seasonally and retailers would clearly prefer to make special deals available to customers as and when they themselves can make arrangements with their suppliers. Clearly, an inability to respond to market changes in this way would place the on-line retailer at a disadvantage when compared to traditional retailing activities. In other situations the shelf-life of data may be even lower. Thus, magazines are monthly or weekly, while most newspapers are only valid for the particular day of issue. Reducing the time scale still further, is common practice for newspapers to change during production, as new news items are received and developments take place. Thus, it is advantageous for editors to be in a position to make updates to the distributed news as and when changes occur. Clearly, when news items are broadcast using conventional radio techniques, the news bulletins are continually updated, thereby placing traditional news publications at a comparative disadvantage.

In the present embodiment the viewable data is retained on a database and signals are read from the database, representing said data, for processing in combination with second signals representing the way in which the information is to be formatted on the viewed page. In a possible configuration, HTML code could be held as a template with gaps therein for the actual viewable data, such that, in response to a request being made, the viewable data could be identified and interlaced with the formatting HTML instructions. However, in the preferred embodiment, a plurality of executable functions are provided at the server such that, in response to a particular request being made, a string of functions are executed resulting in calls being made to appropriate databases in order to obtain viewable information. This viewable information is then processed so as to combine it with HTML tags, to produce output signals for transmission to browsing clients.

HTML instructions for generating the viewable image displayed on monitor 602 are detailed in FIG. 8. Line 1 includes the viewable text (home shopper) and this has been embedded within tags to identify this word as being at the head of the document and as being a title for the whole page. At line 2 the tag identifies the start of the body of the document and within the body of the document a sub-heading "Contents Page" is displayed surrounded by formatting tags H1. Line 3 consists of an HTML instruction to create a horizontal line 700. The Instructions from line 5 onwards create the icons 701 to 706, along with the hyperlinks associated with said icons required in order to allow subsequent pages to be requested by a user.

Each icon is described by two lines, thus icon 701 is defined by lines 5 and 6, icon 702 is defined by lines 7 and 8, icon 703 is defined by lines 10 and 11, icon 704 is defined by lines 12 and 13, icon 705 is defined by lines 15 and 16 and icon 706 is defined by lines 17 and 18. The viewable image is effectively constructed on a line-by-line basis, therefore the instructions effectively originate from left to right, and then from top to bottom. After the sports icon, the word "sports", the electrical icon and the wording "electrical" have been processed, it is necessary to create a new line and paragraph breaks of this type are generated by the p tag, as present at lines 9, 14 and 20. As previously stated, each selectable icon is generated from two lines, the first of which, for example line 5, defines the hyperlink to another page, by means of a URL to the server. The URL defined at line 5 would be recognised as a request for an on-line processing by the server. Subsequent parameters increment from 1000, to 1001, to 1002, to 1003, to 1004 and to 1005, so as to uniquely identify the requested page.

The second line for each entry, for example line 6, specifies the location of the graphical icon, thus the sports icon has been stored in a file identified as "sport.gif", while the electrical icon, defined at line 8, has been stored as "elec.gif", the computer equipment icon has been stored as "comp.gif", the children icon has been stored as "child.gif", the gardening icon has been stored as "gard.gif" and the clothing icon has been stored as "clth.gif". The subsequent coding specifies the location of the icon within the page so as to complete the overall formatting requirements.

From a user's point of view, the image displayed on monitor 602 appears like a high-quality high-definition video image, so as to ensure that a user is not alienated by the system. However, from a transmission point of view, the image displayed on monitor 602 is generated by the instructions shown in FIG. 8. This requires a sophisticated level of processing to be performed by the transmitting server and by the receiving browser but the level of bandwidth required in order to perform the transmission of information is substantially reduced. The transmitted output signal consists of eight data bits for each of the ASCII characters represented in FIG. 8.

Although the bandwidth requirement for transmitting an HTML file of the type shown in FIG. 8 is significantly reduced, when compared to video transmissions, it can be appreciated that the manual generation of a file of the type shown in FIG. 8 would be extremely time consuming, resulting in economic difficulties for anyone wishing to use the technology for distributing information having a short shelf-life, having relatively low value or having both a short life and a low value. In accordance with the present system, it is possible for the information to be derived from conventional databases and for the HTML instructions to be generated on-the-fly, as requests are made by browsing clients. Thus, the generation of instructions of the type shown in FIG. 8 becomes an automated technical process performed in response to strings of code generated functions stored at the server.

HTML output pages are created by assembling portions of HTML instructions, so as to create a page suitable for generating output signals, of the type shown in FIG. 8.

Each portion of output HTML instructions is created by executing a particular function. This function is arranged to process data from a database or databases in the form of viewable data. This viewable data is then processed under the control of the selected function in order to generate a portion of output HTML. A format function of this type may be considered as the smallest unit of instructions for producing a portion of HTML code.

The system as a whole includes a universal family set of all the available functions which may be used in order to generate portions of HTML code. As the system develops, new functions may be added to the family set and it is expected that the HTML standard will be enhanced, thereby requiring additional functions to be created. For any particular application, it is likely that not all of the possible functions will be required, therefore functions may be selected from the universal sets of all available functions. Selected functions are known to both the browser and the server. The browser issues URLs to the server that are understood by the server, resulting in the required HTML page being transmitted back to the browser.

It is possible that a particular server may be configured to run a plurality of applications and that said applications may require a different sub-set of formatting functions derived from a universal set of available functions. In order to accommodate this situation, an initialisation process is performed by the on-line processing routines in order to assemble the required formatting functions in a way which enhances on-line processing speeds.

The formatting functions are arranged to generate small portions of HTML code, such that the universal set of formatting functions is minimised and so that any required output page may be generated by stringing formatting functions together. The pre-processing initialisation procedures consist of identifying strings of formatting functions required to generate particular lines of HTML code. Thus, a particular line of HTML code is produced by sequentially executing a string of formatting functions and the preprocessing step consists of arranging such function strings such that a particular function string, arranged to generate a HTML page, may be quickly sought and executed during on-line operation.

One function string will generate a particular line of HTML code. In most applications, not all lines will take up the same format, therefore it is necessary to generate a plurality of function strings. These function strings are arranged in a string list, with an indexing pointer being provided so as to enable a particular function string to be quickly identified from the list and thereafter executed in order to generate the output HTML instructions.

Figure 9:
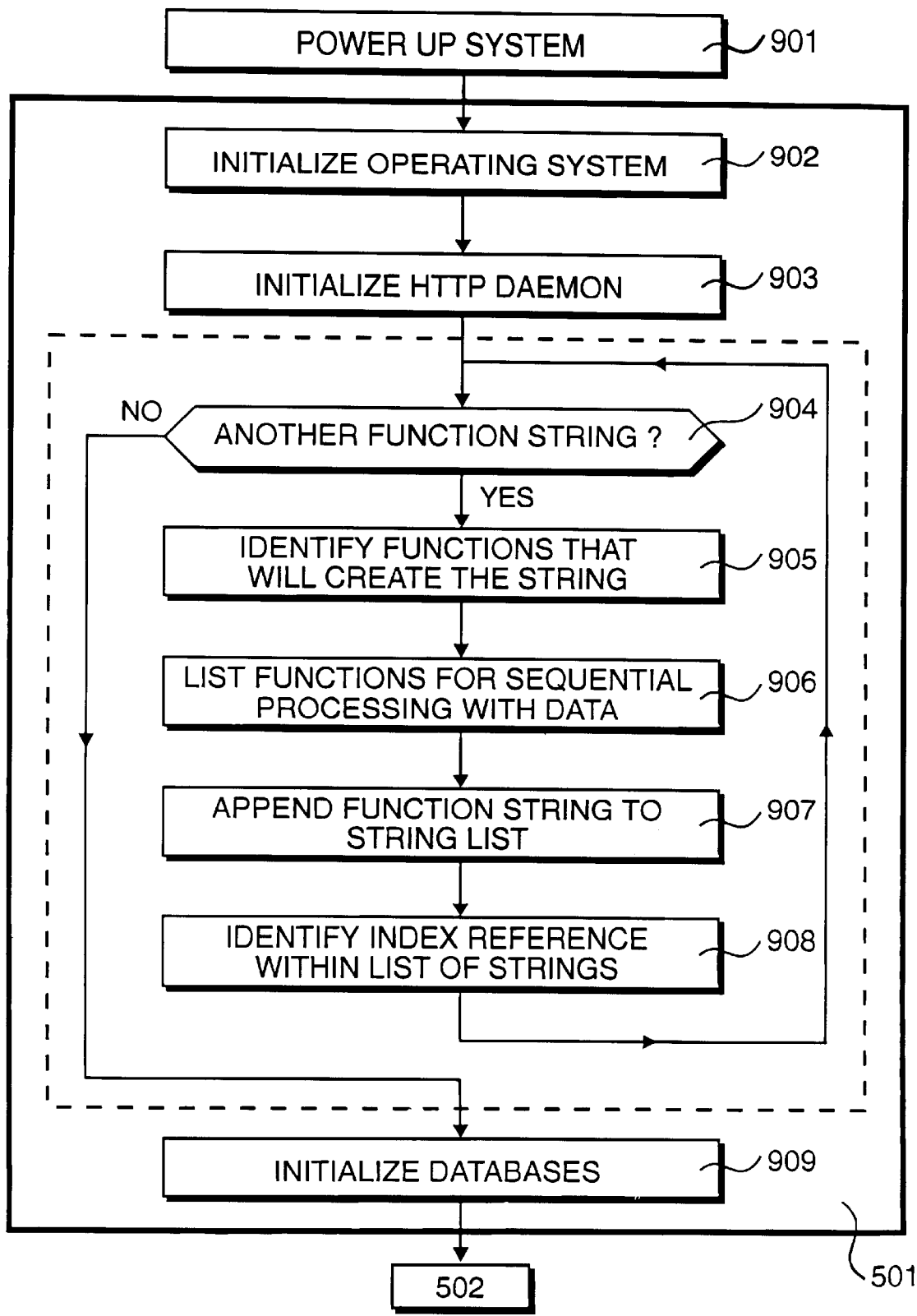
FIG. 9 details the initialisation procedures identified in FIG. 5.

Initialisation step 501 is detailed in FIG. 9 At step 901 the system is effectively activated, which may consist of applying power to the system resulting in an automatic "boot-up" or may consist of a selection being made to perform the particular task, in preference to a previous unrelated task.

At step 902 the operating system is initialised and the system configured so as to facilitate connections to the Internet. This initialisation also includes all standard processes to load peripheral drivers etc., thereby placing the system in an operational condition.

At step 903 conventional procedures are executed in order to initialise the HTTP daemon, whereafter procedures are performed to initialise the on-line processing procedures associated with the present embodiment.

At step 904 a question is asked as to whether another function string is to be generated which, on the first iteration, should be answered in the affirmative. At step 905 the functions required to create the particular string, drawn from the universal set of available functions. are identified and at step 906 the string itself is assembled by listing the functions for sequential processing with data derived from the database or databases. Thus, at step 906 a complete function string is created.

At step 907 the function string generated at step 906 is appended to the string list created for that particular application and at step 908 an indexing reference is identified within the list of strings. Thus, when a particular call is made for formatting signals, in the form of an executable string of functions, the particular call identifies the index reference within the list of strings, resulting in the selected index being selected from the list and thereafter executed in combination with the referenced data.

Thereafter, control is returned to step 904 thereby allowing the next function string to be processed. Eventually, all of the function strings will have been created, appended to the string list and appropriately indexed, resulting in the question asked at step 904 being answered in the negative and control being directed to step 909. At step 909 procedures are implemented to initialise databases, so that data may be accessed from said databases in accordance with conventional techniques.

Figure 10:
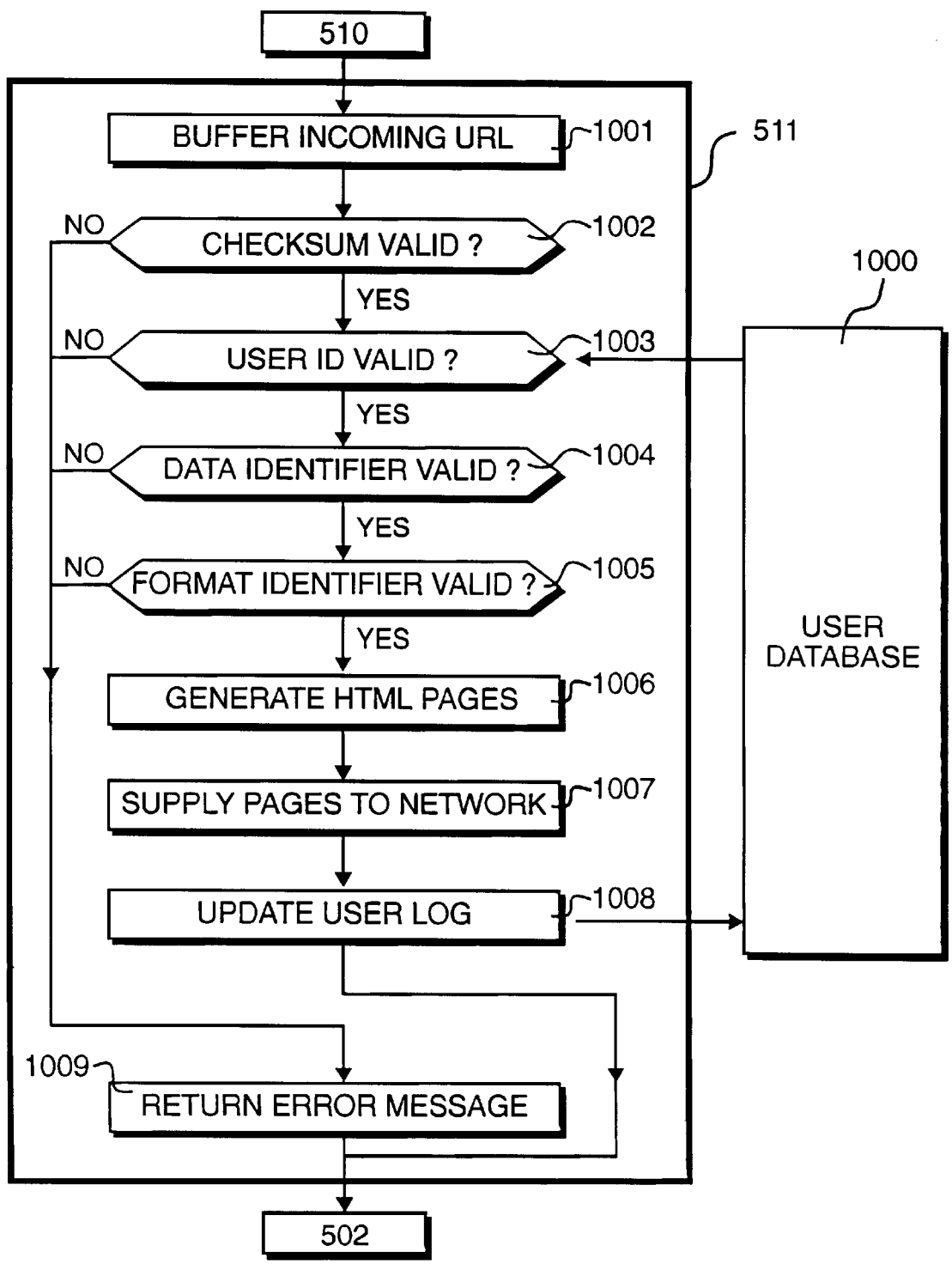
FIG. 10 details the on-line procedures identified in FIG. 5, including an indication of procedures for generating H-TML pages.

The on-line file preparation steps, identified in FIG. 5, are detailed in FIG. 10. At step 1001 the incoming URL, previously processed by the HTTP daemon as illustrated in FIG. 5 is buffered within a data structure defined by the on-line processing routines. The URL will include an element identifying the data required, an element identifying the type of formatting required, information relating to the user and a check sum, so as to reject URLs corrupted during transmission.

At step 1002 a question is asked as to whether the check sum is valid and if this question is answered in the negative, to the effect that the check sum is invalid, control is directed to step 1009 resulting in an error message being returned to the browsing client device, Similarly, a question is asked at step 1003 as to whether the user identification is valid. In order for this question to be answered, it is necessary for a call to be made to a user database which will return an indication as to whether the user can be identified from the database. If it is found that the user ID is not presently available from the database, routines may be called which enable a user to be treated as a new user and open an appropriate account while remaining on-line. Thus, for example, these routines may request the user to supply credit card details etc. so that an account may be established immediately.

In addition, the analysis of the user ID at step 1003 allows additional information to be drawn from the user database relating to that specific user. If a user ID has become invalid, the question asked at step 1003 may be answered in the negative, again resulting in control being directed to step 1009 and an error message being directed to the browsing client.

After the check sum has been validated and the user ID has been validated, a question is asked at step 1004 as to whether the data identifier is valid. Identifiers for data are placed within established formats, thus if the server is unable to identify the data being requested, an error message will be generated at step 1009. Similarly, an identifier for the formatting requested is validated at step 1005, which may again result in an error message being generated at step 1009.

After the data identifier and the format identifier have been validated at their respective steps, the HTML page or pages are generated at step 1006 with reference to the data identifier and the format identifier. Thereafter, with reference to the user ID, the pages are supplied back to the requesting browser via the network.

After pages have been supplied back to the browsing client, the system is aware of this fact and therefore has information as to what was actually supplied to a user at a particular time. In some systems, this information may be considered as having no value and therefore no further action is taken. However, in alternative systems, particularly when products are being sold, marketing information may be considered as highly valuable, therefore provision is made for this information (i.e. an indication of what pages were viewed at what particular time) to be written back to the user database at step 1008. Thus, over time, information will become available relating to user preferences which, under some circumstances, may be used to modify the operation of the system.

It will be appreciated that, during normal operation of the system, various portions of the data will be used on more than one occasion. Thus, in accordance with conventional techniques, data read from a database may be cached such that, on a second iteration, the data may be more readily available, thereby making it unnecessary to make an additional call to the user database 1000. The system may be configured such that data is held in cache for a predetermined period, say thirty minutes. Thus, if no use is made of the data within thirty minutes, the cache may be flushed such that, at any time, data held in the cache represents a snapshot of users who are actually making use of the system.

Figure 11:
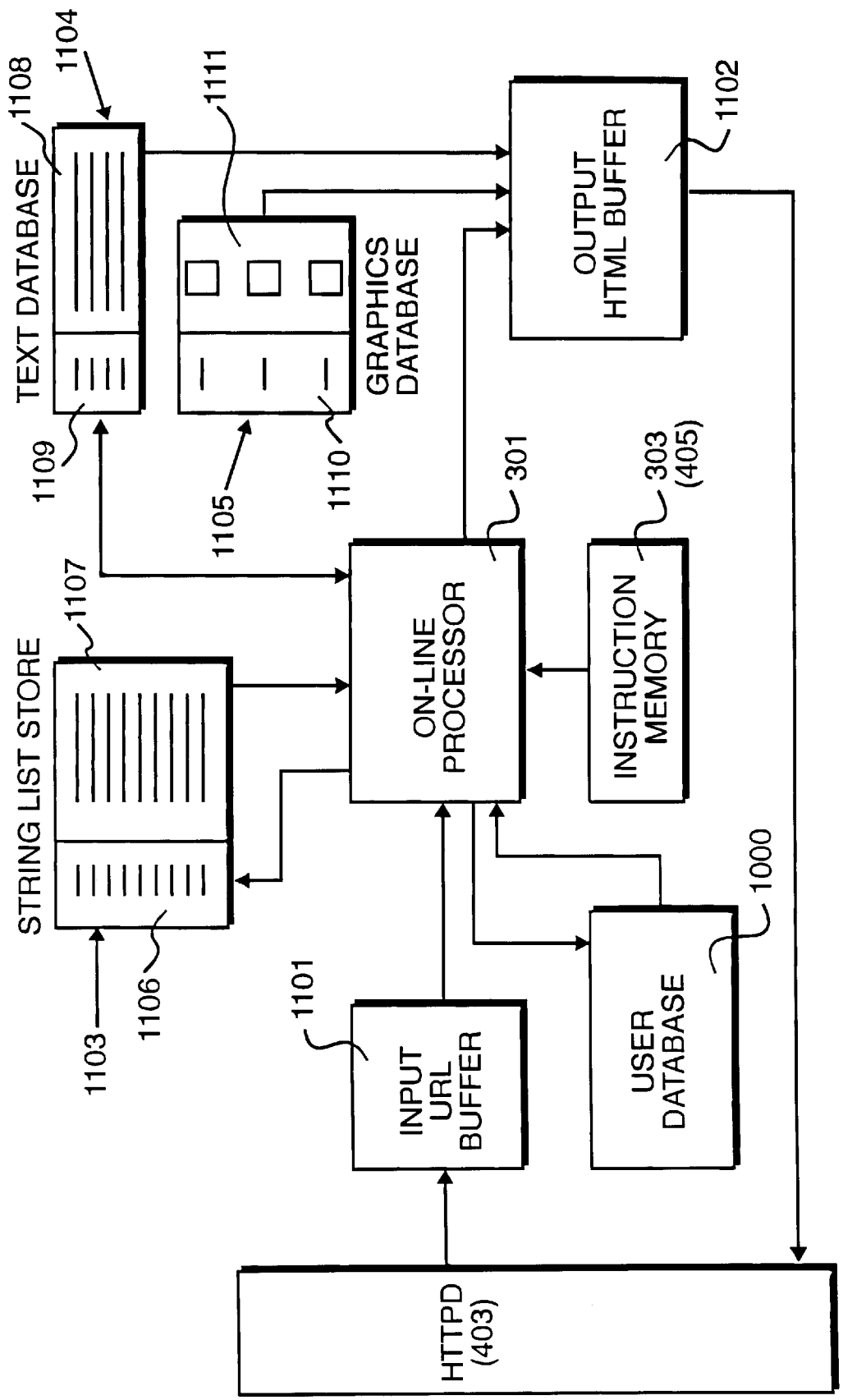
FIG. 11 illustrates the relationship between serving components when configured to supply HTML pages to a requesting device.

A diagrammatic representation of processing unit 301 along with its associated RAM 303, when configured to execute the on-line processing instructions 405 is shown in FIG. 11. The hypertext transport protocol daemon 403 is shown diagrammatically on the left of FIG. 11 and is arranged to supply URLs to an input URL buffer 1101 and to receive output HTML data from an output HTML buffer 1102. The on-line processor 310 (processor 301 of FIG. 3 arranged to execute the on-line processing procedures 405 of FIG. 4) communicates with the user database 1000 as shown in FIG. 10. In addition, the processor 301 is arranged to access strings from a string list store 1103, to access viewable text from a text database 1104 and to access viewable graphics from a graphics database 1105. Each of the databases and the string list store is relational, in that an index, known to the processor 301 relates to a particular database entry. Thus, in response to the processor 301 pointing to an index, the related data is returned back to the processor 301. Thus, the string list store 1103 includes a string index portion 1106 and the actual string list portion 1107. Function strings are added to the string list portion 1107 at step 907 of FIG. 9 with their related index reference being added to portion 1106 at step 908. The processor 301 makes a request in terms of identifying a particular index reference, stored in portion 1106. This index is related to a particular string held in portion 1107. Thus, it is possible to adjust the relationship between indexes and strings, thereby adjusting the way in which the data is actually formatted in response to a particular request.

Similarly, text data in a text database 1104 consists of the text data itself in portion 1108 and related text data indexes in portion 1109. Thus, data is selected from database 1104 by the on-line processor 301 issuing a particular index to portion 1109, resulting in the related data, from portion 1108, being returned to the on-line processor 301. Thus, it is the indices that are known to the on-line processor 301 and the relationship between indices and their related text data may be adjusted, so as to change the actual data that is returned in response to a particular request being made.

The graphics database 1105 is also divided into related portions. consisting of an index portion 1110 and a data portion 1111. Thus, in response to the on-line processor 301 identifying a particular reference within portion 1110, graphical data is read from portion 1111.

As previously stated, a string read from portion 1107 consists of a string of executable functions, Thus, these functions are supplied to the on-line processor 301 for execution on said processor. Execution of a function read from the string list may result in HTML tags being written directly to the output HTML buffer 1102. Alternatively, execution of these functions may result in a call being made to the text database 1104 or to the graphics database 1111. In either event, the call identifies an index, in portion 1109 or portion 1110, which in turn results in the related text data or graphics data being supplied directly to the output HTML buffer 1102.

Thus, the input URL will identify particular types of formatting and particular types of data. The formatting information for the URL will result in particular function strings being read from the string list store 1103. Thereafter, these functions are executed, with reference to the data identifiers, resulting in text data and graphics data being read from the respective databases 1104 and 1105. As the functions are executed, output HTML is written to the output HTML buffer 1102 and after an identified set of functions have been executed, the HTML stored in output buffer 1102 is read, so as to supply the output HTML signals to the HTTP daemon 403.

In addition to using the user database to confirm user validity and to record actions made by the user (possibly for billing purposes) the on-line processor 301 may also make use of information read from the user database in order to adjust the relationship between indexes (1106, 1109, 1110) and their associated function strings and data (1107, 1108, 1111). Thus, it is possible for the processor to respond to a URL in one of three ways. Firstly, in a standard mode of operation, the particular output HTML produced in response to a particular input URL will remain constant. The user database is merely used to check user validity and to record user usage of the system. Thus, output data is not dependent upon user type and all users are supplied with the same data. However, adjustments may be made to the relationship within databases over time, such that updates or upgrades may be made to take account of the circumstances.

Thus, for an in-home shopping situation, the availability of goods and changes in prices may be reflected in database relationships. Similarly, in on-line journals and newspapers, the data relationship may be adjusted in response to editorial control, usually driven by news events. Thus, in a news environment, it is not necessary for editors to create new HTML documents if they wish to supply new documents in this format to users. All the formatting required to produce a page in a particular form is provided within the formatting functions. Thus, in order to update a news item, an editor is merely required to update information contained in the database (usually database 1104) in accordance with conventional database techniques.

As stated above, it is possible for the processor to respond to the URL in one of three possible ways. In a second enhanced mode of operation, it is possible for the user to identify information to the system as a means of expressing user preferences. Thus, in a home shopping environment for example, it is possible for a user to specify the particular goods of interest. Thus, for example, one user may only use the on-line shopping facility when shopping for gardening supplies. The user may relay this information to the system, such that the system will concentrate on gardening products. Thus, on initiating the system, the first URL will result in a reference to gardening supplies, thereby avoiding the first screen shown in FIG. 7, where the client has little interest. The client will still be able to access all of the available functions. For example, the second screen, containing predominantly gardening products, would include a link for "other areas" and on executing this button the user would be effectively supplied with the higher level page, thereby allowing his selections to branch out into the other areas of the on-line catalogue. In a more sophisticated system, the user may only be interested in electrical equipment and sports equipment, such that a first screen would display the sports icon followed by particular types of sport, in combination with the electrical icon followed by particular electrical products. Thus, it is possible for the user to specify preferences such that the system becomes more tailor-made and specific to that particular user.

Such an approach may also be used in news publications. For example, some users may be interested predominantly in financial news while others may be interested in sports news. Thus, with this information programmed into the user database, the order in which pages are supplied to a user may be adjusted in accordance with preferences specified by the user. It will also be possible for users to specify whether the material is being read by children or by adults and for appropriate page selections to be made. Pages designed for children could be written using limited vocabularies and include a higher concentration of hyperlinks, allowing children to rapidly access related information. In many situations, some pages would be appropriate for both types of users and editors would have control as to what is made available at what levels. Similarly, higher charges could be made for particular types of information and, given information derived from the user database, low priced pages or high priced pages could be supplied as appropriate.

In a third mode of operation, identified as a recursive mode of operation, it is not necessary for a user to identify their own preferences in order for adjustments to be made to the actual nature of pages returned to users. The system records a history of usage and thereafter analyses this information in order to determine the relationship between selections made by a browser and the actual data returned back to the customer. Thus, after a number of uses, it may become apparent that a user is only interested in clothing and has shown very little interest in other products available from the catalogue. On detecting this interest, it will be possible for the system to present the clothing page as the first page sent to the user on initiation. Moving on from this, it may be possible to identify particular types of clothing that are of interest to a user. Thus, for example, a user may be only interested in designer labels and having identified this information, it would be possible for the system to give a higher priority to special offers available in this area. Thus, information may be supplied to the system to the effect that a new limited edition has been produced which may be of particular interest to a minority of users of the system. A region may be provided within an initial page to provide special information or advertisements. A particular type of information or advertisement supplied to this region will depend upon customer history. Thus, if information has been supplied to the effect that a limited edition has become available, the system will automatically know which users are interested in obtaining items of this type. Thus, when this particular subset of users log on to the system, the relevant information will be supplied back to them automatically. Similarly, an advertisement for a designer jacket, for example, will not be sent to a user who has previously only shown an interest in computer equipment.

The system will be capable of identifying situations in which particular products have been browsed for significant periods of time by users. The system could be programmed to identify this fact and make an appropriate modification when the user next logs on to the system. For example, having detected that a particular user has shown an interest in a particular product, it may be assumed that a customer is interested in buying this product but, as yet, has not made a final decision. The system may use this information in an attempt to persuade the client to make the purchase. Thus, the system may be programmed to offer discounts to clients such that, on the next use of the system, an advertisement appears to the effect that the product of interest has been reduced by a certain amount. Thus, it is possible that users would perceive this as an offer being made to all clients, with the fact that they have a particular interest in that product being seen as a coincidence. Clearly this is not a coincidence and each user would be offered something which the system had detected as being to their liking.

It can be appreciated that the possibilities are endless. This is all provided by the fact that the actual HTML pages supplied back to users are generated "on-the-fly" by indexing locations within databases. The relationship between an index and an item may be adjusted so that the same instructions may be used to access different data with on-going changes. Similarly, the system may identify the particular user concerned and, in response to this information, select an index which differs from the normal index selected. Alternatively, a particular index identified by a user may be treated by the system as a "wild card", with an actual selection of an index being made in response to information stored about the particular user.

Figure 12:
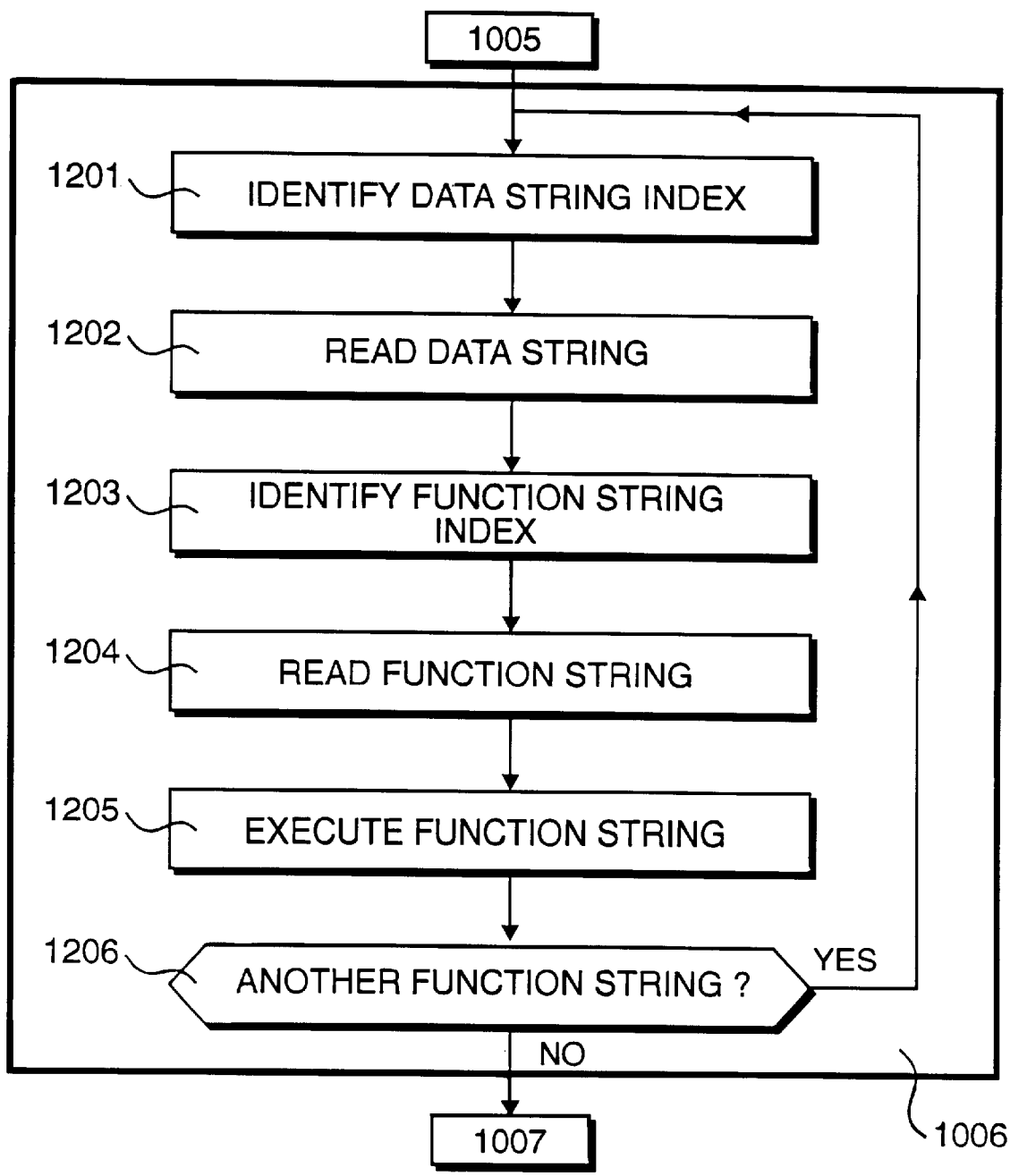
FIG. 12 details procedures for generating HTML pages identified in FIG. 10, including a step for executing a function string.

Operations performed by processor 301, as illustrated in FIG. 11, are detailed in FIG. 12. At step 1201 a data string index is identified enabling the processor 301 to make a call to an appropriate database. At step 1202 a call to the database is made, by issuing the string indexed to the appropriate database, resulting in the data string itself being returned from the database to the processor 301. Thus, as shown in FIG. 11, the read operation performed at step 1202 would result in an index command being issued from the processor 301 to the indexed portion 1109 of database 1104, whereafter the appropriate data, from portion 1108, is returned back to the processor 301.

At step 1203 a function string index is identified, from the formatting information present in the URL and at step 1204 the indexed function string is read from the string list store 1103.

At step 1205 the function string read from the string list store 1103 is executed, resulting in HTML code being written to the output HTML buffer 1102, whereafter, at step 1206, a question is asked as to whether another function string has been identified. If this question is answered in the affirmative, control is returned to step 1201 and the procedures identified above are repeated. Eventually, the question asked at step 1206 will be answered in the negative, resulting in the completion of procedures within step 1006.

Figure 13:
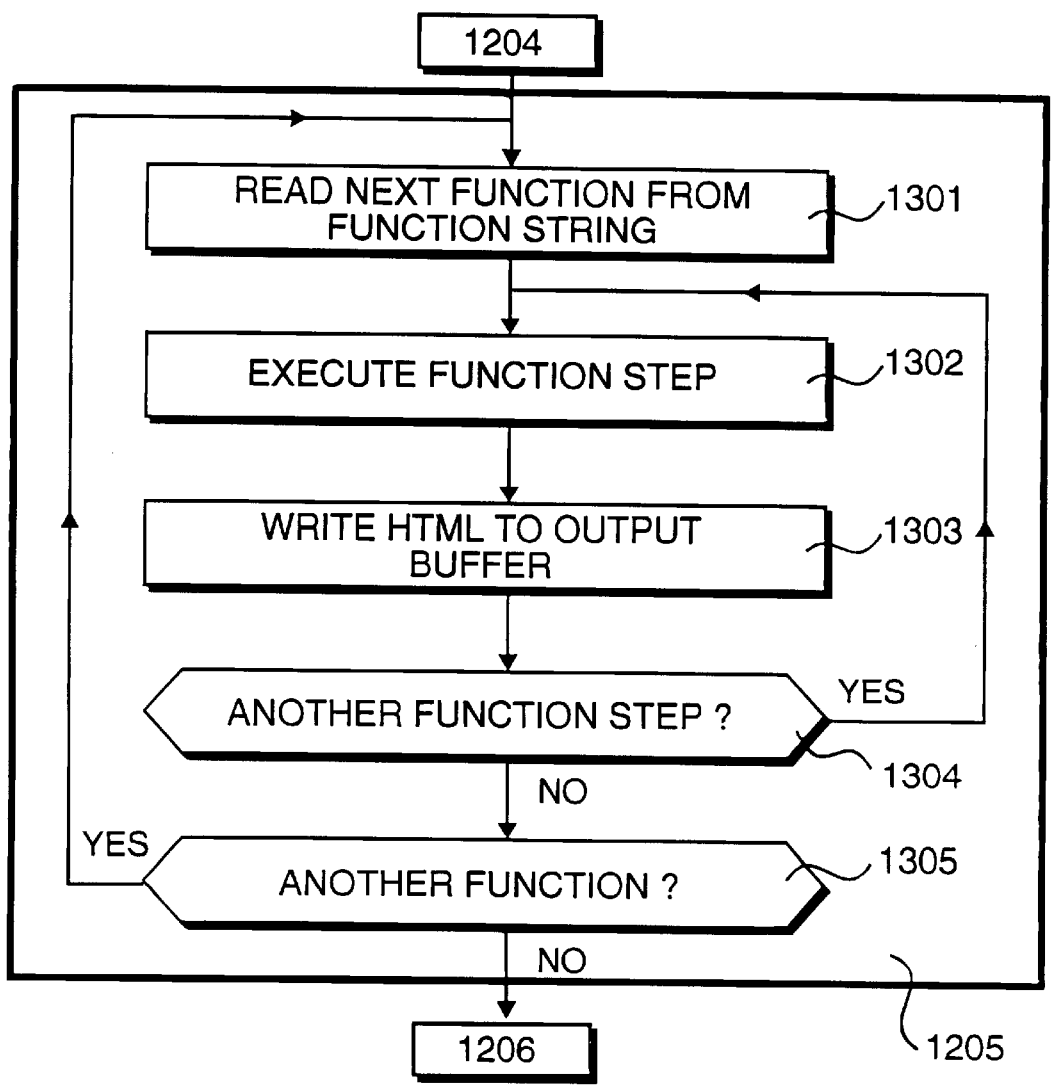
FIG. 13 details procedures for executing a function string, including a function execute step.

Step 1205, for the execution of a string function, is expanded in FIG. 13. A string of functions has been read from the string list store and this string of functions is executed, sequentially function by function, at step 1205.

At step 1301 the next function, i.e. the first function on the first iteration, is read from the function string. At step 1302 this particular function is executed, resulting in a unit of HTML code being written to the output HTML buffer 1102 at step 1303. At step 1304 a question is asked as to whether a function includes a further functional step and if answered in the affirmative, control is returned to step 1302 for the next function step to be executed. Thus, a functional step may be considered as the smallest portion of a function that results in a write to the HTML buffer.

After all the executable steps of the function have been completed, the question asked at step 1304 will be answered in the negative, resulting in a question being asked at step 1305 as to whether another function is present in the string. If another function is present in the string, the question asked at step 1305 will be answered in the affirmative, thereby returning control to step 1301. Thus, steps 1301, 1302, 1303 and 1304 are repeated in order to execute the next executable function within the string read from the string list store.

Eventually, all of the functions making up the string will have been executed, resulting in the question asked at step 1305 being answered in the negative so as to complete procedures within step 1205.

Figure 14:
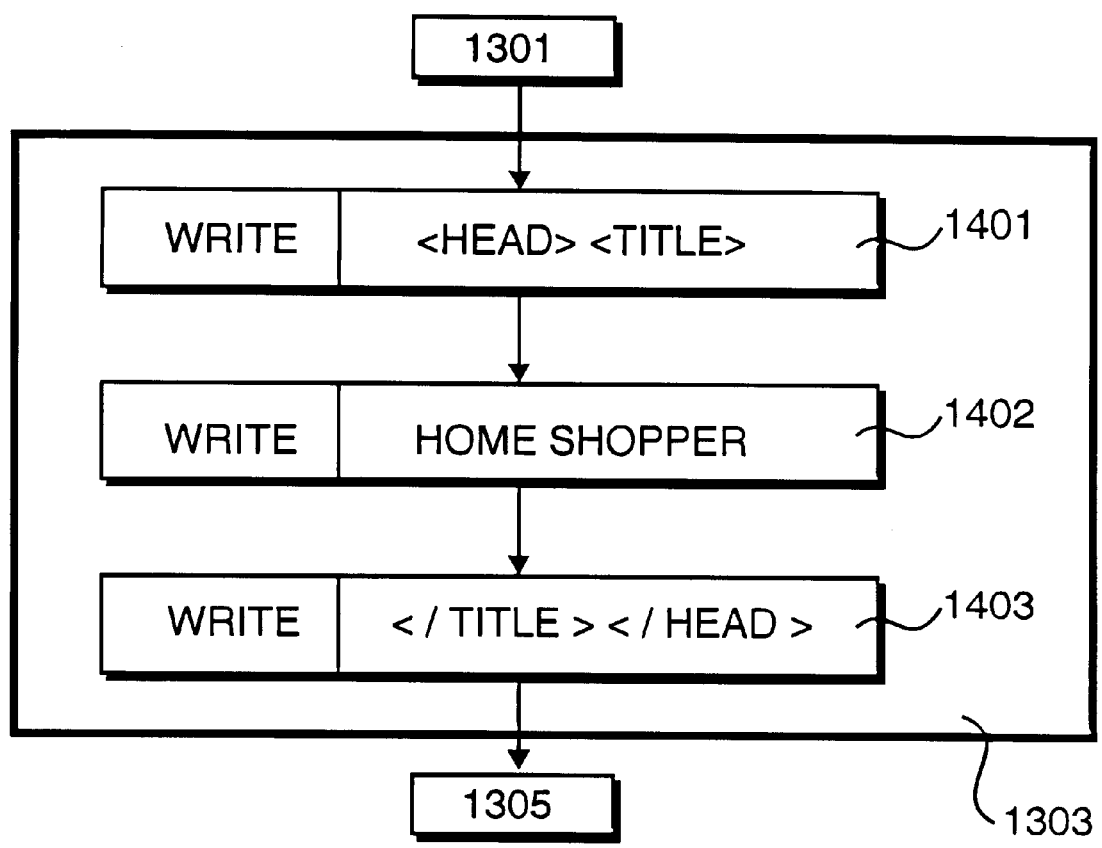
FIG. 14 details function execution steps used to generate lines of output commands of the type identified in FIG. 8.

The functions executed over steps 1302 to 1304 will have been created so as to generate the particular HTML code required. An example of a function is shown in FIG. 14 and it should be appreciated that similar techniques are employed in order to generate all of the available types of HTML code. The function shown in FIG. 14, that may be considered as being executed at step 1303 of FIG. 13, is used to generate the first line of the example HTML code shown in FIG. 8.

A first functional step, shown as step 1401, writes the tags "<HEAD><TITLE>" as the start of line 1. These tags are written to the output HTML buffer at step 1303 and thereafter the question asked at step 1304 would be answered in the affirmative, resulting in the next functional step being executed at step 1302. In the example shown in FIG. 14, this would consist of the execution of step 1402, consisting of a write to the output HTML buffer of the viewable data "Home Shopper". This particular portion of the code is derived by making a call to the text database. Thus, the write instruction consists of a database index. Database 1104 is identified, along with index position 001. Thus, it is known that at index position 001 in the text database 1104 the title of the first page has been stored. Thus, as part of an editing procedure it may be decided that the title should be changed to "Shopping at Home" for example. When a change of this type is required, it is only necessary for an editor to make a change to the database entry stored at index position 001 in database 1104. This can be achieved using conventional database techniques, without any specialist knowledge required of the HTML language used to transmit the information over the Internet. The operation of the system is unaffected by this change of title and the procedure shown at step 1402 will execute as required, irrespective of the nature of the actual title text contained within the database.

Thus, at step 1402 database 1104 is identified, an address to that database is made in the form of identifying index 001 and text is returned to the processor 301. This text is then supplied to the next location of the output HTML buffer 1102 at step 1303 and control is directed to step 1304, where the question is again asked as to whether another functional step is present. Again, this question will be answered in the affirmative, resulting in control being returned to step 1302 so that the next functional step may be executed. As shown in FIG. 14, the next executable step consists of step 1403 which will result in "</TITLE></HEAD>" being written to the output HTML buffer 1102 at step 1303. Again, the question will be asked at step 1304 as to whether another functional step is present and on this occasion the question will be answered in the negative, resulting in control being directed to step 1305.

Thus, it can be seen that a particular function has resulted in three writing operations to the output HTML buffer in the form of a tag, viewable text obtained from a database, followed by another KTML tag. This process is repeated for each of the functions contained within the function string until the full page of HTML code has been generated and written to the HTML buffer 1102. Signals from the HTML buffer 1102 are then supplied to the HTTPD 403 which in turn supplies the signals to the browsing client via the Internet.

The databases for storing text and graphics are of conventional types, having mechanisms for requests to be made for information to be supplied. In particular, requests to databases are made using the structured query language (SQL) and data is obtained from the databases by generating an SQL inquiry.

What is claimed is:

1. A method of serving output signals from a serving device to a plurality of browsing devices connected to a network, wherein said output signals represent commands executable by a browsing device so as to display viewable data in accordance with a specified page format; said method comprising steps of:

identifying requests from browsing devices that define a request for specified viewable data, said request including formatting type identification data;

maintaining a plurality of formatting types of data defining respectively corresponding predetermined formats for portions of said viewable data;

storing content data representing said viewable data;

selecting a specific part of said content data representing specific viewable data;

selecting a specific one of said types of formatting data in response to said formatting type identification data;

processing said content data and said formatting types of data so as to combine said selected part of said content data with said specific one of said types of formatting data, and for outputting processed viewable data with executable instructions; and supplying output signals to the requesting browsing device derived from said output processed data, in which said output signals represent commands executable by a browsing device so as to display said specific viewable data in accordance with a first specified page format when a first type of formatting data is selected and in a second specified page format when a second type of formatting data is selected.

2. A method of serving output signals from a serving device to a plurality of browsing devices connected to a network, wherein said output signals represent HTML (hypertext mark-up language) data executable by a browsing device so as to display viewable data in accordance with a specified page format; said method comprising:

identifying requests from browsing devices that define a request for specified viewable data, said request including formatting type identification data;

maintaining a plurality of formatting types of data defining respectively corresponding predetermined formats for portions of said viewable data;

storing content data representing said viewable data, said content data including graphics data;

selecting a specific part of said content data representing specific viewable data;

selecting a specific one of said types of formatting data in response to said formatting type identification data;

processing said content data and said formatting types of data so as to combine said selected part of said content data with said specific one of said types of formatting data, and for outputting processed data in the form of hypertext mark-up language data; and supplying output signals to the requesting browsing device derived from said hypertext mark-up language data; and in which said output signals represent hypertext mark-up language data executable by a browsing device so as to display said specific viewable data in accordance with a first specified page format when a first type of formatting data is selected and in a second specified page format when a second type for formatting data is selected.

3. A serving device for serving output signals to a plurality of browsing devices connected to a network, wherein said output signals represent commands executable by a browsing device so as to display viewable data in accordance with a specified page format, said serving device comprising:

means for identifying requests from browsing devices that define a request for specified viewable data, said request including formatting type identification data;

means for storing a plurality of formatting types of data defining respectively corresponding predetermined formats for portions of said viewable data;

means for storing content data representing said viewable data;

means for selecting a specific part of said content data representing specific viewable data;

means for selecting a specific one of said types of formatting data in response to said formatting type identification data;

means for processing said read content data and said formatting types of data so as to combine said selected part of said content data with said specific one of said types of formatting data, and for outputting processed data in the form of executable instructions; and means for supplying output signals to the requesting browsing device derived from said output processed data, in which said output signals represent commands executable by a browsing device so as to display said specific viewable data in accordance with a first specified page format when a first type of formatting data is selected and in a second specified page format when a second type of formatting data is selected.

4. A serving device as in claim 1, wherein said content data is stored in a first database and said types of formatting data is stored in a second database such that said viewable data is updateable by updating said content data only.

5. Apparatus as in claim 1, wherein output signals sent to a browsing client are derived in dependence upon an indication of the identity of the user.

6. Apparatus as in claim 5, wherein output signals sent to a browsing client are derived in dependence upon a stored indication of previous user selections.

7. Apparatus according to claim 1, wherein:

a request from a browsing client takes the form of a resource location, a first database is accessed in response to this resource location to identify a function, said function retrieves viewable data from a second database, and said viewable data is combined with mark-up language codes to produce said executable instructions.

8. A serving device as in claim 1, wherein:

said serving device further comprises a user database storing information relating to each of a plurality of users, said request includes data relating to a user identity, said serving device determines whether the user identity is stored on said user database, and when said user identity is stored on said user database said serving device serves output signals in dependence of stored information relating to said user identity.

9. A serving device as in claim 8, wherein said stored information relating to said user identity relates to previous requests from said user.

10. A serving device as in claim 9, wherein a particular region is provided within a page to provide advertisements and a particular type of advertisement supplied to said region depends on said previous requests from said user.

11. A serving device as in claim 1, wherein:

said request includes data relating to a user identity;

said content data is stored in a content database having an index portion containing a plurality of indexes and a content data portion containing a plurality of database entries, such that said database entries have related indices; and said serving device further comprises a user database for storing information relating to each of a plurality of users, the relationship between said indexes and said database entries being adjustable in response to information read from said user database, whereby said specific part of said content data is selected in response said user identity.

12. A serving device for serving output signals to a plurality of browsing devices connected to a network, wherein said output signals represent HTML (hypertext mark-up language) data executable by a browsing device so as to display viewable data in accordance with a specified page format, said serving device comprising:

means for identifying requests from browsing devices that define a request for specified viewable data, said request including formatting type identification data;

means for storing a plurality of formatting types of data defining predetermined formats for portions of said viewable data;

means for storing a plurality of formatting types of data defining predetermined formats for portions of said viewable data;

means for selecting a specific part of said content data representing specific viewable data;

means for selecting a specific one of said types of formatting data in response to said formatting type identification data;

means for processing said content data and said formatting types of data so as to combine said selected part of said content data with said specific one of said types of formatting data, and for outputting processed data in the form of HTML data; and means for supplying output signals to the requesting browsing device derived from said HTML data, in which said output signals represent HTML data executable by a browsing device so as to display said specific viewable data in accordance with a first specified page format when a first type of formatting data is selected and in a second specified page format when a second type of formatting data is selected.

13. A serving device as in claim 12, wherein said content data is stored in a first database and said types of formatting data is stored in a second data base such that said viewable data is updateable by updating said content data only.

14. A serving device as in claim 12, wherein:

said serving device further comprises a user database storing information relating to each of a plurality of users, request includes data relating to a user identity, said serving device determines whether the user identity is stored on said user database, and when said user identity is stored on said user database said serving device serves output signals in dependence of stored information relating to said user identity.

15. A serving device as in claim 14, wherein said stored information relating to said user identity relates to previous requests from said user.

16. A serving device as in claim 15, wherein a particular region is provided within a page to provide advertisements and a particular type of advertisement supplied to said region depends on said previous requests from said user.

17. A serving device as in claim 12, wherein:

said request includes data relating to a user identity;

said content data is stored in a content database having an index portion containing a plurality of indexes and a content data portion containing a plurality of database entries, such that said database entries have related indices; and said serving device further comprises a user database for storing information relating to each of a plurality of users, the relationship between said indexes and said database entries being adjustable in response to information read from said user database, whereby said specific part of said content data is selected in response said user identity.

* * * * *